United States Patent
Takahashi et al.

(10) Patent No.: US 11,602,004 B2
(45) Date of Patent: Mar. 7, 2023

(54) USER EQUIPMENT, BASE STATION, AND CONNECTION ESTABLISHMENT METHOD

(71) Applicant: NTT DOCOMO, INC., Tokyo (JP)

(72) Inventors: Hideaki Takahashi, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/771,031

(22) PCT Filed: Nov. 4, 2016

(86) PCT No.: PCT/JP2016/082807
§ 371 (c)(1),
(2) Date: Apr. 25, 2018

(87) PCT Pub. No.: WO2017/078140
PCT Pub. Date: May 11, 2017

(65) Prior Publication Data
US 2018/0310359 A1     Oct. 25, 2018

(30) Foreign Application Priority Data

Nov. 5, 2015   (JP) .................................. 2015-218015
May 12, 2016   (JP) .............................. JP2016-096521
Jul. 14, 2016   (JP) .................................. 2016-139715

(51) Int. Cl.
*H04W 76/27*      (2018.01)
*H04W 88/02*      (2009.01)
(Continued)

(52) U.S. Cl.
CPC ....... *H04W 76/27* (2018.02); *H04W 74/0833* (2013.01); *H04W 76/10* (2018.02);
(Continued)

(58) Field of Classification Search
CPC .. H04W 74/0833; H04W 76/10; H04W 76/27
See application file for complete search history.

(56) References Cited

U.S. PATENT DOCUMENTS 10,237,907 B2*   3/2019   Min .................. H04W 36/0085
10,764,937 B2*   9/2020   Kim ........................ H04W 4/00
(Continued)

OTHER PUBLICATIONS

International Search Report issued in PCT/JP2016/082807 dated Jan. 24, 2017 (7 pages).
(Continued)

*Primary Examiner* — Edan Orgad
*Assistant Examiner* — Won Tae C Kim
(74) *Attorney, Agent, or Firm* — Osha Bergman Watanabe & Burton LLP

(57) ABSTRACT

Provided is a user equipment in a mobile communication system that supports a function of performing connection establishment reusing context information retained in each of the user equipment and a base station, including: a receiving unit that receives instruction information indicating whether or not the base station has a function of performing RRC connection reusing retained context from the base station; a determining unit that determines whether or not the base station has the function on the basis of the instruction information received through the receiving unit; and a transmitting unit that transmits a message including context retention information indicating that the user equipment retains user equipment side context information to the base station when the determining unit determines that the base station has the function.

14 Claims, 36 Drawing Sheets

(51) Int. Cl.
*H04W 76/19* (2018.01)
*H04W 88/08* (2009.01)
*H04W 76/10* (2018.01)
*H04W 76/30* (2018.01)
*H04W 74/08* (2009.01)

(52) U.S. Cl.
CPC ........... *H04W 76/19* (2018.02); *H04W 76/30* (2018.02); *H04W 88/02* (2013.01); *H04W 88/08* (2013.01)

(56) References Cited

U.S. PATENT DOCUMENTS

| | | | | |
|---|---|---|---|---|
| 2014/0334371 | A1* | 11/2014 | Kim | H04W 52/0206 370/311 |
| 2016/0007213 | A1* | 1/2016 | Cui | H04W 4/70 370/230 |
| 2016/0360479 | A1* | 12/2016 | Kim | H04W 52/0206 |
| 2018/0352416 | A1* | 12/2018 | Ryu | H04W 4/70 |
| 2018/0376531 | A1* | 12/2018 | Martinez Tarradell | H04W 76/10 |
| 2019/0053034 | A1* | 2/2019 | Kim | H04W 8/08 |
| 2019/0098571 | A1* | 3/2019 | Kim | H04W 52/0206 |
| 2019/0116519 | A1* | 4/2019 | Park | H04W 28/12 |
| 2019/0141609 | A1* | 5/2019 | Kim | H04W 48/02 |
| 2019/0141776 | A1* | 5/2019 | Kim | H04W 76/27 |
| 2020/0314943 | A1* | 10/2020 | Kim | H04W 76/25 |

OTHER PUBLICATIONS

Written Opinion of the International Searching Authority issued in PCT/JP2016/082807 dated Jan. 24, 2017 (4 pages).
3GPP TS 36.413 V12.4.0; "3rd Generation Partnership Project; Technical Specification Group Radio Access Network Evolved Universal Terrestrial Radio Access Network (E-UTRAN); S1 Application Protocol (S1AP) (Release 12)" Dec. 2014 (300 pages).
Ericsson; "New WID proposal: Signalling Reduction for Idle-Active Transitions in LTE"; 3GPP TSG RAN Meeting #66, RP-142030; Maui, USA; Dec. 8-11, 2014 (6 pages).
3GPP TR 23.720 V1.1.0; "3rd Generation Partnership Project; Technical Specification Group Services and System Aspects; Architecture enhancements for Cellular Internet of Things (Release 13)"; Oct. 2015 (90 pages).
3GPP TS 36.331 V12.6.0; "3rd Generation Partnership Project; Technical Specification Group Radio Access Network; Evolved Universal Terrestrial Radio Access (E-UTRA); Radio Resource Control (RRC); Protocol specification (Release 12)"; Jun. 2015 (448 pages).
3GPP TS 36.321 V12.7.0; "3rd Generation Partnership Project; Technical Specification Group Radio Access Network; Evolved Universal Terrestrial Radio Access (E-UTRA); Medium Access Control (MAC) protocol specification (Release 12)"; Sep. 2015 (77 pages).
3GPP TS 24.301 V13.6.1; "3rd Generation Partnership Project; Technical Specification Group Core Network and Terminals; Non-Access-Stratum (NAS) protocol for Evolved Packet System (EPS); Stage 3 (Release 13)"; Jun. 2016 (452 pages).
3GPP TS 36.300 V11.13.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; Mar. 2015 (210 pages).
3GPP TS 23.401 V13.4.0; "3rd Generation Partnership Project; Technical Specification Group Services and System Aspects; General Packet Radio Service (GPRS) enhancements for Evolved Universal Terrestrial Radio Access Network (E-UTRAN) access (Release 13)"; Sep. 2015 (334 pages).
JP Office Action issued in JP Application No. 2016-139715 drafted Jan. 18, 2017 (Notification of Reasons for Refusal); (5 pages).
Office Action issued in the counterpart Chilean Patent Application No. 201801154, dated Jan. 23, 2020 (19 pages).
Office Action issue in the counterpart European Patent Application No. 16 862 199.3, dated Sep. 18, 2020 (5 pages).
Office Action issue in the counterpart Chinese Patent Application No. 201680063461.0, dated Jan. 25, 2021 (19 pages).
Office Action issued in Chinese Application No. 201680063461.0; dated Jun. 29, 2021 (16 pages).

* cited by examiner

FIG.15A

```
                    RRCConnectionRequest message
-- ASN1START

RRCConnectionRequest ::=        SEQUENCE {
    criticalExtensions              CHOICE {
        rrcConnectionRequest-r8         RRCConnectionRequest-r8-IEs,
        criticalExtensionsFuture        SEQUENCE {}
    }
}

RRCConnectionRequest-r8-IEs ::= SEQUENCE {
    ue-Identity                     InitialUE-Identity,
    establishmentCause              EstablishmentCause,
    ue-ContextStoring-r13spare                          BIT STRING (SIZE (1))ENUMERATED {true}
                        OPTIONAL
}

InitialUE-Identity ::=          CHOICE {
    s-TMSI                          S-TMSI,
    randomValue                     BIT STRING (SIZE (40))
}

EstablishmentCause ::=          ENUMERATED {
                                    emergency, highPriorityAccess, mt-Access, mo-Signalling,
                                    mo-Data, delayTolerantAccess-v1020, spare2, spare1}

-- ASN1STOP
```

FIG.15B

| RRCConnectionRequest field descriptions |
|---|
| establishmentCause<br>Provides the establishment cause for the RRC connection request as provided by the upper layers. W.r.t. the cause value names: highPriorityAccess concerns AC11..AC15, 'mt' stands for 'Mobile Terminating' and 'mo' for 'Mobile Originating. |
| randomValue<br>Integer value in the range 0 to $2^{40} - 1$. |
| ue-ContextStoring<br>Indicates that the UE keeps the UE context established in the previous RRC connection. |
| ue-Identity<br>UE identity included to facilitate contention resolution by lower layers. |

FIG.16A

```
                        RRCConnectionSetup message

-- ASN1START

RRCConnectionSetup ::=              SEQUENCE {
    rrc-TransactionIdentifier           RRC-TransactionIdentifier,
    criticalExtensions                  CHOICE {
        c1                                  CHOICE {
            rrcConnectionSetup-r8               RRCConnectionSetup-r8-IEs,
            spare7 NULL,
            spare6 NULL, spare5 NULL, spare4 NULL,
            spare3 NULL, spare2 NULL, spare1 NULL
        },
        criticalExtensionsFuture        SEQUENCE {}
    }
}

RRCConnectionSetup-r8-IEs ::=       SEQUENCE {
    radioResourceConfigDedicated        RadioResourceConfigDedicated,
    nonCriticalExtension                RRCConnectionSetup-v8a0-IEs         OPTIONAL
}

RRCConnectionSetup-v8a0-IEs ::= SEQUENCE {
    lateNonCriticalExtension            OCTET STRING                        OPTIONAL,
    nonCriticalExtension                RRCConnectionSetup-v13xy-IEsSEQUENCE-()
    OPTIONAL
}

RRCConnectionSetup-v13xy-IEs ::= SEQUENCE {
    ue-ContextStored-r13                ENUMERATED {true}                   OPTIONAL,
    ue-AuthenticationInfoReq-r13        ENUMERATED {true}                   OPTIONAL,
    nonCriticalExtension                SEQUENCE {}                         OPTIONAL
}

-- ASN1STOP
```

FIG.16B

| RRCConnectionSetup field descriptions |
|---|
| *ue-AuthenticationInfoReq*<br>Query for the UE to retrieve the authentication information. |
| *ue-ContextStored*<br>Indicates that the eNB stores the corresponding UE context for the UE. If this field is present, the UE shall ignore the *radioRecourceConfigDedicated* field received in this message. |

FIG.17

```
                    RRCConnectionSetupComplete message

-- ASN1START

RRCConnectionSetupComplete ::=        SEQUENCE {
    rrc-TransactionIdentifier          RRC-TransactionIdentifier,
    criticalExtensions                 CHOICE {
        c1                                 CHOICE{
            rrcConnectionSetupComplete-r8       RRCConnectionSetupComplete-r8-IEs,
            spare3 NULL, spare2 NULL, spare1 NULL
        },
        criticalExtensionsFuture           SEQUENCE {}
    }
}

RRCConnectionSetupComplete-r8-IEs ::= SEQUENCE {
    selectedPLMN-Identity              INTEGER (1..maxPLMN-r11),
    registeredMME                      RegisteredMME                       OPTIONAL,
    dedicatedInfoNAS                   DedicatedInfoNAS,
    nonCriticalExtension               RRCConnectionSetupComplete-v8a0-IEs OPTIONAL
}

RRCConnectionSetupComplete-v8a0-IEs ::= SEQUENCE {
    lateNonCriticalExtension           OCTET STRING                        OPTIONAL,
    nonCriticalExtension               RRCConnectionSetupComplete-v1020-IEs OPTIONAL
}

RRCConnectionSetupComplete-v1020-IEs ::= SEQUENCE {
    gummei-Type-r10                    ENUMERATED {native, mapped}         OPTIONAL,
    rlf-InfoAvailable-r10              ENUMERATED {true}                   OPTIONAL,
    logMeasAvailable-r10               ENUMERATED {true}                   OPTIONAL,
    rn-SubframeConfigReq-r10           ENUMERATED {required, notRequired}  OPTIONAL,
                                       RRCConnectionSetupComplete-v1130-Ies   OPTIONAL
}

RRCConnectionSetupComplete-v1130-IEs ::= SEQUENCE {
    connEstFailInfoAvailable-r11       ENUMERATED {true}                   OPTIONAL,
    nonCriticalExtension               RRCConnectionSetupComplete-v1250-IEs   OPTIONAL
}

RRCConnectionSetupComplete-v1250-IEs ::= SEQUENCE {
    mobilityState-r12                  ENUMERATED {normal, medium, high, spare} OPTIONAL,
    mobilityHistoryAvail-r12           ENUMERATED {true}                   OPTIONAL,
    logMeasAvailableMBSFN-r12          ENUMERATED {true}                   OPTIONAL,
    nonCriticalExtension               RRCConnectionSetupComplete-v13xySEQUENCE {}
    OPTIONAL
}

RRCConnectionSetupComplete-v13xy-IEs ::= SEQUENCE {
    ue-AuthenticationToken-r13         BIT STRING (SIZE (40))              OPTIONAL,
    ue-AuthenticationInfo-r13          shortMAC-I                          OPTIONAL
}

RegisteredMME ::=                     SEQUENCE {
    plmn-Identity                      PLMN-Identity                       OPTIONAL,
    mmegi                              BIT STRING (SIZE (16)),
    mmec                               MMEC
}

-- ASN1STOP
```

FIG.18A

```
                            RRCConnectionRelease message
-- ASN1START

RRCConnectionRelease ::=           SEQUENCE {
    rrc-TransactionIdentifier          RRC-TransactionIdentifier,
    criticalExtensions                 CHOICE {
        c1                                 CHOICE {
            rrcConnectionRelease-r8            RRCConnectionRelease-r8-IEs,
            spare3 NULL, spare2 NULL, spare1 NULL
        },
        criticalExtensionsFuture           SEQUENCE {}
    }
```

```
        utra-TDD-r9                                                    
        ...,
        utra-TDD-r10                       CellInfoListUTRA-TDD-r10
    }                                                                  OPTIONAL, -- Cond Redirection
    nonCriticalExtension           RRCConnectionRelease-v1020-IEs       OPTIONAL
}

RRCConnectionRelease-v1020-IEs ::= SEQUENCE {
    extendedWaitTime-r10               INTEGER (1..1800)              OPTIONAL, -- Need ON
    nonCriticalExtension               SEQUENCE {}                    OPTIONAL
}

ReleaseCause ::=               ENUMERATED {loadBalancingTAUrequired,
                                           other, cs-FallbackHighPriority-v1020, spareUEcontextHolding-v13cy}

RedirectedCarrierInfo ::=      CHOICE {
    eutra                              ARFCN-ValueEUTRA,
    geran                              CarrierFreqsGERAN,
    utra-FDD                           ARFCN-ValueUTRA,
    utra-TDD                           ARFCN-ValueUTRA,
    cdma2000-HRPD                      CarrierFreqCDMA2000,
    cdma2000-1xRTT                     CarrierFreqCDMA2000,
    ...,
                                       CarrierFreqListUTRA-TDD-r10
```

...foUTRA-r9)) OF CellInfoUTRA-FDD-r9

FIG.18B

| RRCConnectionRelease field descriptions |
|---|
| releaseCause |
| The *releaseCause* is used to indicate the reason for releasing the RRC Connection. The cause value *cs-FallbackHighPriority* is only applicable when *redirectedCarrierInfo* is present with the value set to *utra-FDD*, *utra-TDD* or *utra-TDD-r10*. E-UTRAN should not set the *releaseCause* to *loadBalancingTAURequired* or to *cs-FallbackHighPriority* if the *extendedWaitTime* is present. <u>The value *ue-ContextHolding* indicates that the UE shall keep the UE context while the UE is in RRC_IDLE.</u> |

FIG.19A

```
                              RRCConnectionRelease message
-- ASN1START

RRCConnectionRelease ::=            SEQUENCE {
    rrc-TransactionIdentifier           RRC-TransactionIdentifier,
    criticalExtensions                  CHOICE {
        c1                                  CHOICE {
            rrcConnectionRelease-r8             RRCConnectionRelease-r8-IEs,
                                         spare1 NULL
    cellInfoList-r9
        geran-r9                            CellIn
        utra-FDD-r9                         CellInfoListUTRA-FDD
        utra-TDD-r9                         CellInfoListUTRA-TDD-r9,
        ...,
        utra-TDD-r10                        CellInfoListUTRA-TDD-r10
    }                                                           OPTIONAL, -- Cond Redirection
    nonCriticalExtension                RRCConnectionRelease-v1020-IEs      OPTIONAL
}

RRCConnectionRelease-v1020-IEs ::=  SEQUENCE {
    extendedWaitTime-r10                INTEGER (1..1800)   OPTIONAL,    -- Need ON
    nonCriticalExtension                RRCConnectionRelease-v13xy-IEsSEQUENCE {}
    OPTIONAL
}

RRCConnectionRelease-v13xy-IEs ::=  SEQUENCE {
    ue-ContextHolding-r13               ENUMERATED {true}   OPTIONAL,-- Need ON
    nonCriticalExtension                SEQUENCE {}         OPTIONAL
}

ReleaseCause ::=            ENUMERATED {loadBalancingTAUrequired,
                                        other, cs-FallbackHighPriority-v1020, spare1}

RedirectedCarrierInfo ::=           CHOICE {
    eutra                               ARFCN-ValueEUTRA,
    geran                               CarrierFreqsGERAN,
    utra-FDD                            ARFCN-ValueUTRA,
    utra-TDD                            ARFCN-ValueUTRA,
    cdma2000-HRPD                       CarrierFreqCDMA2000,
```

FIG.19B

| RRCConnectionRelease field descriptions |
|---|
| *ue-ContextHolding* <br> Indicates to keep the UE context while the UE is in RRC_IDLE. |

FIG.23

```
SystemInformationBlockType2 information element

-- ASN1START

SystemInformationBlockType2 ::=    SEQUENCE {
    ac-BarringInfo                     SEQUENCE {
        ac-BarringForEmergency             BOOLEAN,
        ac-BarringForMO-Signalling         AC-BarringConfig         OPTIONAL,    -- Need OP
        ac-BarringForMO-Data               AC-BarringConfig         OPTIONAL     -- Need OP
    }                                                               OPTIONAL,    -- Need OP
    radioResourceConfigCommon          RadioResourceConfigCommonSIB,
    ue-TimersAndConstants              UE-TimersAndConstants,
    freqInfo                           SEQUENCE {
        ul-CarrierFreq                     ARFCN-ValueEUTRA         OPTIONAL,    -- Need OP
        ul-Bandwidth                       ENUMERATED {n6, n15, n25, n50, n75, n100}
                                                                    OPTIONAL,    -- Need OP
        additionalSpectrumEmission         AdditionalSpectrumEmission
    },
    mbsfn-SubframeConfigList           MBSFN-SubframeConfigList     OPTIONAL,    -- Need OR
    timeAlignmentTimerCommon           TimeAlignmentTimer,
    ...,
    lateNonCriticalExtension   OCTET STRING (CONTAINING SystemInformationBlockType2-v8h0-IEs)
                                                                    OPTIONAL,
    [[  ssac-BarringForMMTEL-Voice-r9     AC-BarringConfig          OPTIONAL,    -- Need OP
        ssac-BarringForMMTEL-Video-r9     AC-BarringConfig          OPTIONAL     -- Need OP
    ]],
    [[  ac-BarringForCSFB-r10             AC-BarringConfig          OPTIONAL     -- Need OP
    ]],
    [[  ac-BarringSkipForMMTELVoice-r12   ENUMERATED {true}         OPTIONAL,    -- Need OP
        ac-BarringSkipForMMTELVideo-r12   ENUMERATED {true}         OPTIONAL,    -- Need OP
        ac-BarringSkipForSMS-r12          ENUMERATED {true}         OPTIONAL,    -- Need OP
        ac-BarringPerPLMN-List-r12        AC-BarringPerPLMN-List-r12 OPTIONAL    -- Need OP
    ]],
    [[  voiceServiceCauseIndication-r12   ENUMERATED {true}         OPTIONAL     -- Need OP
    ]],
    [[  acdc-BarringForCommon-r13         ACDC-BarringForCommon-r13 OPTIONAL,    -- Need OP
        acdc-BarringPerPLMN-List-r13      ACDC-BarringPerPLMN-List-r13 OPTIONAL  -- Need OP
    ]],
    [[  upCIoTEPSOptimisationAllowed-r13  ENUMERATED {true}         OPTIONAL,    -- Need OP
        cpCIoTEPSOptimisationAllowed-r13  ENUMERATED {true}         OPTIONAL,    -- Need OP
        attachWithoutPDNConAllowed-r13    ENUMERATED {true}         OPTIONAL,    -- Need OP
        useFullResumeID-r13               ENUMERATED {true}         OPTIONAL     -- Need OP
    ]]
}

SystemInformationBlockType2-v8h0-IEs ::= SEQUENCE {
    multiBandInfoList          SEQUENCE (SIZE (1..maxMultiBands)) OF AdditionalSpectrumEmission
        OPTIONAL,    -- Need OR
    nonCriticalExtension       SystemInformationBlockType2-v9e0-IEs    OPTIONAL
}
```

FIG.24

| SystemInformationBlockType2 field descriptions |
|---|
| *attachWithoutPDNConAllowed* <br> This field indicates if the UE is allowed to attach without PDCP connectivity. |
| *cpCIoTEPSOptimisationAllowed* <br> This field indicates if the UE is allowed to establish the connection with Control plane CIoT EPS Optimisations, see TS 24.301 [35]. |
| *upCIoTEPSOptimisationAllowed* <br> This field indicates if the UE is allowed to resume the connection with User plane CIoT EPS Optimisations, see TS 24.301 [35]. |

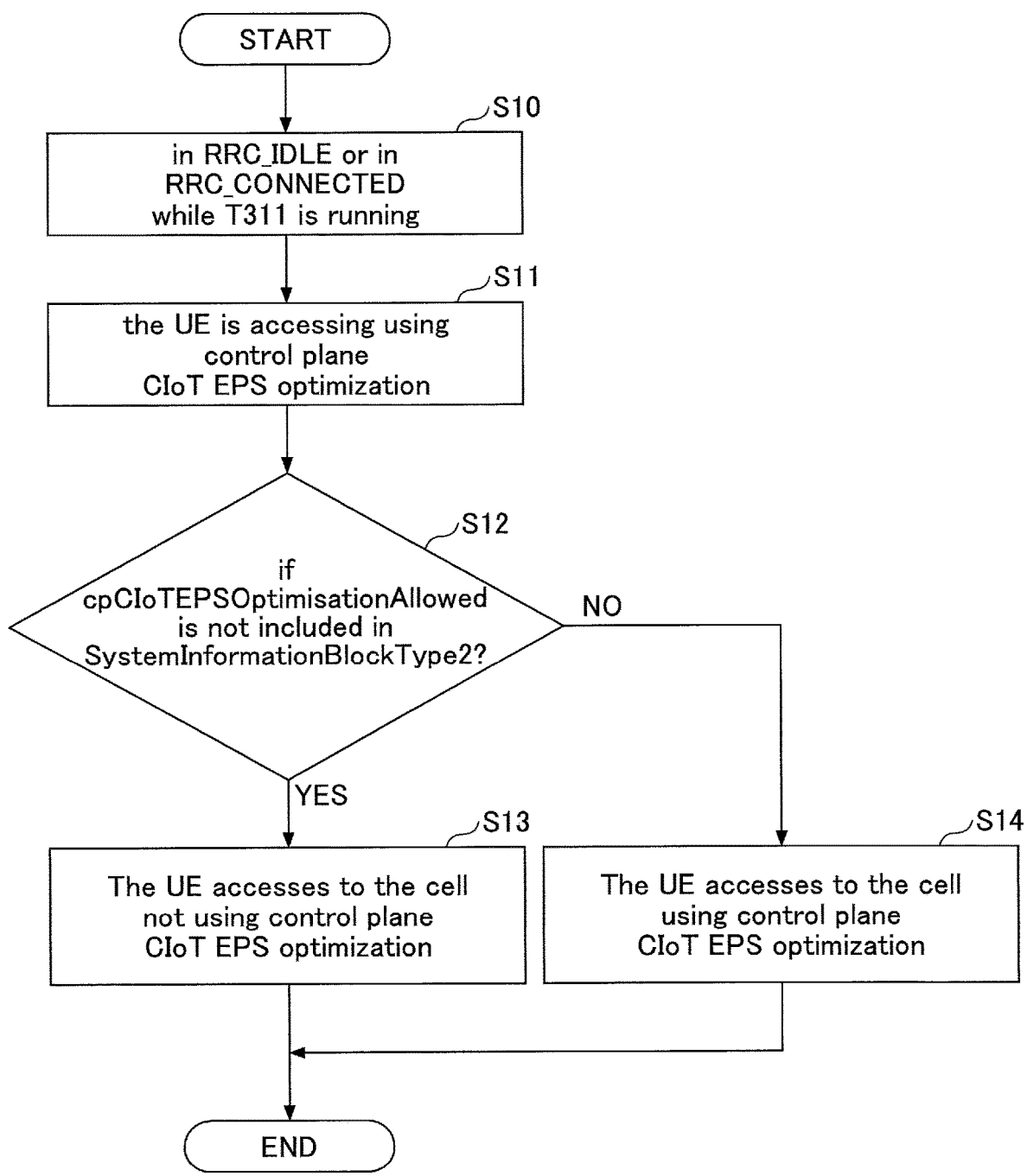

FIG.27

> 5.2.2.9 Actions upon reception of *SystemInformationBlockType2*
>
> Upon receiving *SystemInformationBlockType2*, the UE shall:
>
> 1> apply the configuration included in the *radioResourceConfigCommon*;
>
> 1> if upper layers indicate that a (UE specific) paging cycle is configured:
>
> 2> apply the shortest of the (UE specific) paging cycle and the *defaultPagingCycle* included in the *radioResourceConfigCommon*;
>
> 1> if the *mbsfn-SubframeConfigList* is included:
>
> 2> consider that DL assignments may occur in the MBSFN subframes indicated in the *mbsfn-SubframeConfigList* under the conditions specified in [23, 7.1];
>
> 1> apply the specified PCCH configuration defined in 9.1.1.3;
>
> 1> not apply the *timeAlignmentTimerCommon*;
>
> 1> if in RRC_CONNECTED and UE is configured with RLF timers and constants values received within *rlf-TimersAndConstants*:
>
> 2> not update its values of the timers and constants in *ue-TimersAndConstants* except for the value of timer T300;
>
> 1> if in RRC_CONNECTED while T311 is not running; and the UE supports multi-band cells as defined by bit 31 in *featureGroupIndicators* or *multipleNS-Pmax*:
>
> 2> disregard the *additionalSpectrumEmission* and *ul-CarrierFreq*, if received, while in RRC_CONNECTED;
>
> 1> if in RRC_IDLE or in RRC_CONNECTED while T311 is running; and
>
> 1> if the UE is accessing using control plane CIoT EPS optimization; and
>
> 1> if *cpCIoTEPSOptimisationAllowed* is not included in *SystemInformationBlockType2*:
>
> 2> The UE accesses to the cell not using control plane CIoT EPS optimization;

FIG.28

5.2.2.9     Actions upon reception of *SystemInformationBlockType2*

Upon receiving *SystemInformationBlockType2*, the UE shall:

1> apply the configuration included in the *radioResourceConfigCommon*;

1> if upper layers indicate that a (UE specific) paging cycle is configured:

2> apply the shortest of the (UE specific) paging cycle and the *defaultPagingCycle* included in the *radioResourceConfigCommon*;

1> if the *mbsfn-SubframeConfigList* is included:

2> consider that DL assignments may occur in the MBSFN subframes indicated in the *mbsfn-SubframeConfigList* under the conditions specified in [23, 7.1];

1> apply the specified PCCH configuration defined in 9.1.1.3;

1> not apply the *timeAlignmentTimerCommon*;

1> if in RRC_CONNECTED and UE is configured with RLF timers and constants values received within *rlf-TimersAndConstants*:

2> not update its values of the timers and constants in *ue-TimersAndConstants* except for the value of timer T300;

1> if in RRC_CONNECTED while T311 is not running; and the UE supports multi-band cells as defined by bit 31 in *featureGroupIndicators* or *multipleNS-Pmax*:

2> disregard the *additionalSpectrumEmission* and *ul-CarrierFreq*, if received, while in RRC_CONNECTED;

1> <u>if in RRC_IDLE or in RRC_CONNECTED while T311 is running; and</u>

1> <u>if the UE is accessing using control plane CIoT EPS optimization; and</u>

1> <u>if *cpCIoTEPSOptimisationAllowed* is not included in *SystemInformationBlockType2*:</u>

2> <u>if upCIoTEPSOptimisationAllowed is included in SystemInformationBlockType2:</u>

3> <u>The UE accesses to the cell using user plane CIoT EPS optimization;</u>

2> <u>else:</u>

3> <u>consider the cell as barred in accordance with TS 36.304 [4];</u>

FIG.29

| |
|---|
| 5.3.1.3  Suspend and resume of the NAS signalling connection |
| Suspend of the NAS signalling connection can be initiated by the network in EMM-CONNECTED mode when User plane CIoT EPS optimization is used. Resume of the suspended NAS signalling connection is initiated by the UE.<br><br>In the UE, when User plane CIoT EPS optimization is used:<br><br>- Upon indication from the lower layers that the RRC connection has been suspended, the UE shall enter EMM-IDLE mode with suspend indication, but shall not consider the NAS signalling connection released;<br><br>- Upon trigger of a procedure using an initial NAS message when in EMM-IDLE mode with suspend indication, the UE in NB-S1 mode shall request the lower layer to resume the RRC connection. In this request to the lower layer the NAS shall provide to the lower layer the RRC establishment cause and the call type according to annex D of this document;<br><br>- <u>Upon trigger of a procedure using an initial NAS message when in EMM-IDLE mode with suspend indication, if support of Use plane CIoT EPS optimization is received as part of the broadcast system information, the UE in WB-S1 mode shall request the lower layer to resume the RRC connection. In this request to the lower layer the NAS shall provide to the lower layer the RRC establishment cause and the call type according to annex D of this document. If support of Use plane CIoT EPS optimization is not received as part of the broadcast system information, the UE in WB-S1 mode shall send an initial NAS message including SERVICE REQUEST and request the lower layer to initiate an RRC connection ;</u><br><br>- Upon indication from the lower layers that the RRC connection has been resumed when in EMM-IDLE mode with suspend indication, the UE shall enter EMM-CONNECTED mode. If a SERVICE REQUEST message is pending, the message shall not be sent. If an initial NAS message different from SERVICE REQUEST message is pending, the message shall b sent;<br><br>NOTE: If a NAS message is discarded and not sent to the network, the uplink NAS COUNT value corresponding to that message is reused for the next uplink NAS message to be sent. |

FIG.30

5.5.1.2.4　　　　　Attach accepted by the network

During an attach for emergency bearer services, if not restricted by local regulations, the MME shall not check for mobility and access restrictions, regional restrictions, subscription restrictions, or perform CSG access control when processing the ATTACH REQUEST message. The network shall not apply subscribed APN based congestion control during an attach procedure for emergency bearer services.

If the attach request is accepted by the network, the MME shall send an ATTACH ACCEPT message to the UE and start timer T3450.

If the attach request included the PDN CONNECTIVITY REQUEST message in the ESM message container information element to request PDN connectivity, the MME when accepting the attach request shall send the ATTACH ACCEPT message together with an ACTIVATE DEFAULT EPS BEARER CONTEXT REQUEST message contained in the ESM message container information element to activate the default bearer (see subclause 6.4.1). The network may also initiate the activation of dedicated bearers towards the UE by invoking the dedicated EPS bearer context activation procedure (see subclause 6.4.2).

If EMM-REGISTERED without PDN connection is supported by the UE and the MME, and the UE included an ESM DUMMY MESSAGE in the ESM message container information element of the ATTACH REQUEST message, the MME shall send the ATTACH ACCEPT message together with an ESM DUMMY MESSAGE contained in the ESM message container information element.

If the attach request is accepted by the network, the MME shall delete the stored UE radio capability information, if any.

In NB-S1 mode, if the attach request is accepted by the network, the MME shall set the EMC BS bit to zero in the EPS network feature support IE included in the ATTACH ACCEPT message to indicate that support of emergency bearer services in NB-S1 mode is not available.

If the MME supports and accepts the use of PSM, and the T3412 extended value IE in the ATTACH REQUEST message, then the MME shall take into account the T3412 value requested IE and the T3412 extended value IE in the ATTACH ACCEPT message.

NOTE 4:　Besides the value requested by the UE, the MME can take local configuration or subscription data
　　　　　　provided by the HSS into account when selecting a value for T3412 (3GPP TS 23.401 [10]
　　　　　　subclause 4.3.17.3).

If the UE indicates support for CIoT EPS optimizations in the ATTACH REQUEST message, and the network supports CIoT EPS optimizations, and the MME supports EMM-REGISTERED without PDN connection, the MME shall indicate support for EMM-REGISTERED without PDN connection in the EPS network feature support IE of the ATTACH ACCEPT message. The UE and the MME shall use the information whether the peer entity supports EMM-REGISTERED without PDN connection as specified in the present clause 5 and in clause 6.

In NB-S1 mode, if the UE requested "control plane CIoT EPS optimization" in the Additional update type IE, indicates only support of control plane CIoT EPS optimization in the UE network capability IE and the MME decides to accept the attach request, the MME shall indicate "control plane CIoT EPS optimization" in the Additional update result IE.

In WB-S1 mode, if the PLMN support of control plane CIoT EPS optimization is not received as part of the broadcast system information, then the UE shall not request "control plane CIoT EPS optimization" in the Additional update type IE of the ATTACH REQUEST message.

If the MME supports the extended protocol configuration options IE and the UE indicated support of the extended protocol configuration options IE, then the MME shall set the ePCO bit to "extended protocol configuration options supported" in the UE network capability IE of the ATTACH ACCEPT message.

FIG.31

5.5.3.2.4  Normal and periodic tracking area updating procedure accepted by the network

If the tracking area update request has been accepted by the network, the MME shall send a TRACKING AREA UPDATE ACCEPT message to the UE. If the MME assigns a new GUTI for the UE, a GUTI shall be included in the TRACKING AREA UPDATE ACCEPT message. In this case, the MME shall start timer T3450 and enter state EMM-COMMON-PROCEDURE-INITIATED as described in subclause 5.4.1. The MME may include a new TAI list for the UE in the TRACKING AREA UPDATE ACCEPT message.

> NOTE 1: When assigning the TAI list, the MME can take into account the eNodeB's capability of support of CIoT EPS optimization.

If the UE has included the UE network capability IE or the MS network capability IE or both in the TRACKING AREA UPDATE REQUEST message, the MME shall store all octets received from the UE, up to the maximum length defined for the respective information element.

> NOTE 2: This information is forwarded to the new MME during inter-MME handover or to the new SGSN during inter-system handover to A/Gb mode or Iu mode.

> NOTE 3: For further details concerning the handling of the MS network capability and UE network capability in the MME see also 3GPP TS 23.401 [10].

In NB-S1 mode, if the tracking area update request is accepted by the network, the MME shall set the EMC BS bit to zero in the EPS network feature support IE included in the TRACKING AREA UPDATE ACCEPT message to indicate that support of emergency bearer services in NB-S1 mode is not available.

If a UE radio capability information update needed IE is included in the TRACKING AREA UPDATE REQUEST message, the MME shall delete the stored UE radio capability information, if any.

If the UE specific DRX parameter was included in the DRX Parameter IE in the TRACKING AREA UPDATE REQUEST message, the network shall replace any stored UE specific DRX parameter with the received parameter and use it for the downlink transfer of signalling and user data.

In NB-S1 mode, if the UE requested "control plane CIoT EPS optimization" in the Additional update type IE, indicates only support of control plane CIoT EPS optimization in the UE network capability IE and the MME decides to accept the tracking area update request, the MME shall indicate "control plane CIoT EPS optimization" in the Additional update result IE.

<u>In WB-S1 mode, if the PLMN support of control plane CIoT EPS optimization is not received as part of the broadcast system information, then the UE shall not request "control plane CIoT EPS optimization" in the Additional update type IE of the TRACKING AREA UPDATE REQUEST message.</u>

5.6.1.2.2 UE is using EPS services with Control Plane CIoT EPS optimizations The UE in NB-S1 mode shall send a CONTROL PLANE SERVICE REQUEST message, start T3417 and enter the state EMM-SERVICE-REQUEST-INITIATED.

In WB-S1 mode, if the PLMN support of control plane CIoT EPS optimization is received as part of the broadcast system information, the UE sends a CONTROL PLANE SERVICE REQUEST message, start T3417 and enter the state EMM-SERVICE-REQUEST-INITIATED. Otherwise, the UE sends a SERVICE REQUEST or EXTENDED SERVICE REQUEST message, start T3417 or T3417ext and enter the state EMM-SERVICE-REQUEST-INITIATED.

For case a in subclause 5.6.1.1, the data service type of the CONTROL PLANE SERVICE REQUEST message shall indicate "mobile terminating request". The UE shall not include any ESM message.

For cases b and m in subclause 5.6.1.1,

- if the UE has pending IP or non-IP user data that is to be sent via the control plane radio bearers, the data service type of the CONTROL PLANE SERVICE REQUEST message shall indicate "mobile originating request". The UE shall include an ESM DATA TRANSPORT message in the ESM message container IE; and

- if the UE has pending IP or non-IP user data that is to be sent via the user plane radio bearers, the UE shall set the "active" flag in the Data service type IE to 1. The UE shall not include any ESM message.

- if the UE has pending SMS message, the data service type of the CONTROL PLANE SERVICE REQUEST message shall indicate "mobile originating request". The UE shall include the SMS message in the NAS message container IE.

For case c in subclause 5.6.1.1,

- the UE shall set the data service type of the CONTROL PLANE SERVICE REQUEST message to "mobile originating request" and shall not include any ESM message.

Figure 5.6.1.1.1: Service request procedure (part 1)

USER EQUIPMENT, BASE STATION, AND CONNECTION ESTABLISHMENT METHOD

TECHNICAL FIELD

The present invention relates to a technique in which each of a user equipment UE and a base station eNB in a mobile communication system retains a UE context.

BACKGROUND ART

In an LTE system, as a connected state of a user equipment UE (hereinafter referred to as a "UE") with a base station eNB (hereinafter referred to as an "eNB"), there are two states, that is, a radio resource control (RRC) idle state (RRC_Idle) and an RRC connected state (RRC_Connected).

When the UE is connected to a network, a UE context is generated by a mobility management entity (MME) on a core NW side, and in the RRC connected state, the UE context is retained in a UE and an eNB with which the UE is connected. The UE context is information including bearer-related information, security-related information, and the like.

When the UE performs transition between the RRC idle state and the RRC connected state, signaling of call control including the core NW side frequently occurs, and a method of reducing the signaling is a problem.

For example, when the UE transitions from the RRC connected state to the RRC idle state, signaling illustrated in FIG. 1 occurs (Non-Patent Document 1 or the like). The case of FIG. 1 is a case in which an eNB 2 detects that communication of a UE 1 is not performed for a predetermined time, disconnects a connection with the UE 1, and transitions to the RRC idle state.

In FIG. 1, the eNB 2 transmits a UE context release request to an MME 3 (step 1). The MME 3 transmits a bearer release request (Release Access Bearers Request) to a serving gateway (S-GW 4) (step 2), and the S-GW 4 transmits a bearer release response (Release Access Bearers Response) to the MME 3 (step 3).

The MME 3 transmits a UE context release command to the eNB 2 (step 4). The eNB 2 transmits an RRC connection release to the UE 1 (step 5), releases the UE context for the UE 1, and transitions to the RRC idle state. Further, the eNB 2 releases the UE context and transmits a UE context release complete to the MME 3 (step 6).

CITATION LIST

Non-Patent Document

Non-Patent Document 1: 3GPP TS 36.413 V12.4.0 (2014 December)
Non-Patent Document 2: 3GPP TSG RAN Meeting #66 RP-142030 Maui, USA, 8-11 Dec. 2014
Non-Patent Document 3: 3GPP TR 23.720 V1.1.0 (2015 October)
Non-Patent Document 4: 3GPP TS 36.331 V12.6.0 (2015 June)
Non-Patent Document 5: 3GPP TS 36.321 V12.7.0 (2015 September)
Non-Patent Document 6: 3GPP TS 24.301 V13.6.1

SUMMARY OF THE INVENTION

Problem to be Solved by the Invention

In a signaling procedure illustrated in FIG. 1, signaling frequently occurs at the time of the RRC connection release, and even when the UE transitions from the RRC idle state to the RRC connected state again, signaling frequently occurs.

In order to reduce the signaling when the UE performs transition between the RRC idle state and the RRC connected state, a method of retaining the UE context in the eNB and the UE and reusing the UE context when the UE performs transition of the RRC connected state→the RRC idle state→the RRC connected state within the same eNB has come under review (Non-Patent Document 2). An example of a procedure considered in the method will be described with reference to FIG. 2.

(a) FIG. 2 illustrates a state in which the UE 1 is in the RRC connected state, and a connection of S1-C related to the UE 1 and a connection of S1-U (S1-C/U in FIG. 2) are established on the core NW side. The connection of S1-C is an S1 connection in which a C-plane signal is transmitted, and the connection of S1-U is an S1 connection passing through a U-plane.

The UE 1 transitions from the state illustrated in (a) to the RRC idle state in accordance with a RRC connection release as illustrated in (b) and (c). At this time, the UE context for the UE 1 is retained in the eNB 2, the UE context for the eNB 2 is also retained in the UE 1, and the S1-C/U connection for the UE 1 is also maintained. Then, as illustrated in (d), when the UE 1 transitions to the RRC connected state, the eNB 2 and the UE 1 reuse the retained UE context, and thus the RRC connection is established while reducing the signaling.

Here, (d) of FIG. 2 illustrates an example in which the UE 1 and the eNB 2 establish the RRC connection using the retained UE contexts, but generally, the UE does not recognize whether or not the eNB supports a function of retaining a reusable UE context.

For example, when a UE 6 retaining the UE context used for the connection with an eNB B moves to an eNB A in the RRC idle state as illustrated in FIG. 3, it is unclear to the UE 6 whether or not the eNB A supports the UE context retention function.

In this regard, for example, it is considered that the UE constantly performs an operation of reusing the UE context when transition from the RRC idle state to the RRC connected state is performed. As the operation of reusing the UE context, an operation of giving a notification of information indicating that the UE retains the UE context to the eNB is considered. However, the eNB that does not support the UE context retention function is unable to detect information related to such a notification. In order to perform a stable operation, it is desirable that the UE performs the operation of reusing the UE context when the eNB of the serving cell is confirmed to have the UE context retention function.

The present invention was made in light of the foregoing, and it is an object of the present invention to provide a technique capable of enabling a user equipment to determine whether or not a base station has a function of reusing context information in a mobile communication system in which a function of performing connection establishment by reusing context information retained in each of the user equipment and the base station is supported.

Means for Solving Problem

According to an embodiment of the present invention, provided is a user equipment in a mobile communication system that supports a function of performing connection establishment reusing context information retained in each of the user equipment and a base station, including: a receiving unit that receives instruction information indicating whether or not the base station has a function of performing RRC connection reusing retained context from the base station; a determining unit that determines whether or not the base station has the function on the basis of the instruction information received through the receiving unit; and a transmitting unit that transmits a message including context retention information indicating that the user equipment retains user equipment side context information to the base station when the determining unit determines that the base station has the function.

According to an embodiment of the present invention, provided is a base station in a mobile communication system that supports a function of performing connection establishment reusing context information retained in each of a user equipment and the base station, including: a transmitting unit that transmits instruction information indicating whether or not the base station has a function of performing an RRC connection reusing retained context to the user equipment; and a receiving unit that receives a message including context retention information indicating that the user equipment retains user equipment side context information when the user equipment determines that the base station has the function on the basis of the instruction information from the user equipment.

According to an embodiment of the present invention, provided is connection establishment method performed by a user equipment in a mobile communication system that supports a function of performing connection establishment reusing context information retained in each of the user equipment and a base station, the connection establishment method including: a reception step of receiving instruction information indicating whether or not the base station has a function of performing RRC connection reusing retained context from the base station; a determination step of determining determines whether or not the base station has the function on the basis of the instruction information received in the reception step; and a transmission step of transmitting a message including context retention information indicating that the user equipment retains user equipment side context information to the base station when the base station is determined to have the function in the determination step.

According to an embodiment of the present invention, provided is a connection establishment method performed by a base station in a mobile communication system that supports a function of performing connection establishment reusing context information retained in each of a user equipment and the base station, the connection establishment method including: a transmission step of transmitting instruction information indicating whether or not the base station has a function of performing an RRC connection reusing retained context to the user equipment; and a reception step of receiving a message including context retention information indicating that the user equipment retains user equipment side context information when the user equipment determines that the base station has the function on the basis of the instruction information from the user equipment.

Effect of the Invention

According to the embodiment of the present invention, a technique capable of enabling a user equipment to determine whether or not a base station has a function of reusing context information in a mobile communication system in which a function of performing connection establishment by reusing context information retained in each of the user equipment and the base station is supported is provided.

BRIEF DESCRIPTION OF DRAWINGS

FIG. 15A is a diagram illustrating a specification modification of an RRC Connection Request message;

FIG. 15B is a diagram illustrating a specification modification of an RRC Connection Request message;

FIG. 16A is a diagram illustrating a specification modification of an RRC Connection Setup message;

FIG. 16B is a diagram illustrating a specification modification of an RRC Connection Setup message;

FIG. 17 is a diagram illustrating a specification modification of an RRC Connection Setup Complete message;

FIG. 18A is a diagram illustrating a first specification modification of an RRC Connection Release message;

FIG. 18B is a diagram illustrating a first specification modification of an RRC Connection Release message;

FIG. 19A is a diagram illustrating a second specification modification of an RRC Connection Release message;

FIG. 19B is a diagram illustrating a second specification modification of an RRC Connection Release message;

FIG. 23 is a diagram illustrating a specification modification of an SIB 2;

FIG. 24 is a diagram illustrating a specification modification of an SIB 2;

FIG. 25 is a flowchart for describing an exemplary operation 1 of a UE when an SIB 2 is received;

FIG. 27 is a diagram illustrating a specification modification of an SIB 2;

FIG. 28 is a diagram illustrating a specification modification of an SIB 2;

FIG. 29 illustrates a specification modification of 3GPP TS 24.301;

FIG. 30 is a diagram illustrating a specification modification of 3GPP TS 24.301;

FIG. 31 is a diagram illustrating a specification modification of 3GPP TS 24.301;

FIG. 32 is a diagram illustrating a specification modification of 3GPP TS 24.301;

MODE(S) FOR CARRYING OUT THE INVENTION

Hereinafter, exemplary embodiments of the present invention will be described with reference to the appended drawings. Further, embodiments to be described below are merely examples, and an embodiment to which the present invention is applied is not limited to the following embodiments. For example, in the present embodiment, description will proceed with an LTE system, but the present invention can be applied to various schemes without being limited to LTE. Further, in this specification and claims set forth below, a term "LTE" is not limited to a specific Rel (release) of 3GPP unless otherwise specified. Further, "LTE" includes "5G."

Examples of various schemes mentioned above include SUPER 3G, IMT-advanced, 4G, 5G, future radio access (FRA), W-CDMA (registered trademark), GSM (registered trademark), CDMA 2000, ultra mobile broadband (UMB) IEEE 802.11 (Wi-Fi), IEEE 802.16 (WiMAX), IEEE 802.20, ultra-wide band (UWB), Bluetooth (registered trademark), and a next generation system expanded on the basis of them.

(Overall System Configuration)

Figure 1:
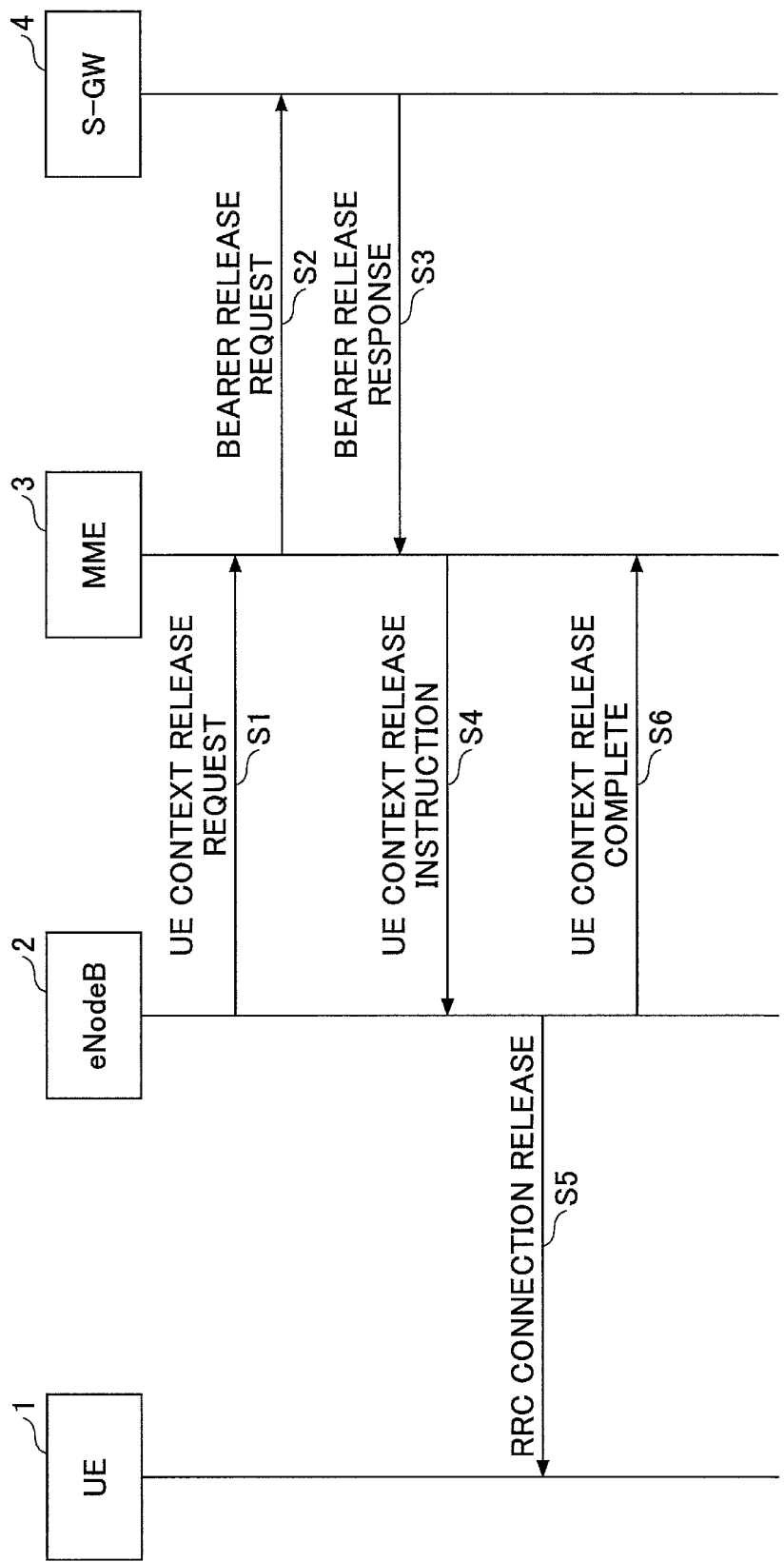
FIG. 1 is a diagram illustrating an example of a signaling sequence when transition to the RRC idle state is performed.
Figure 2:
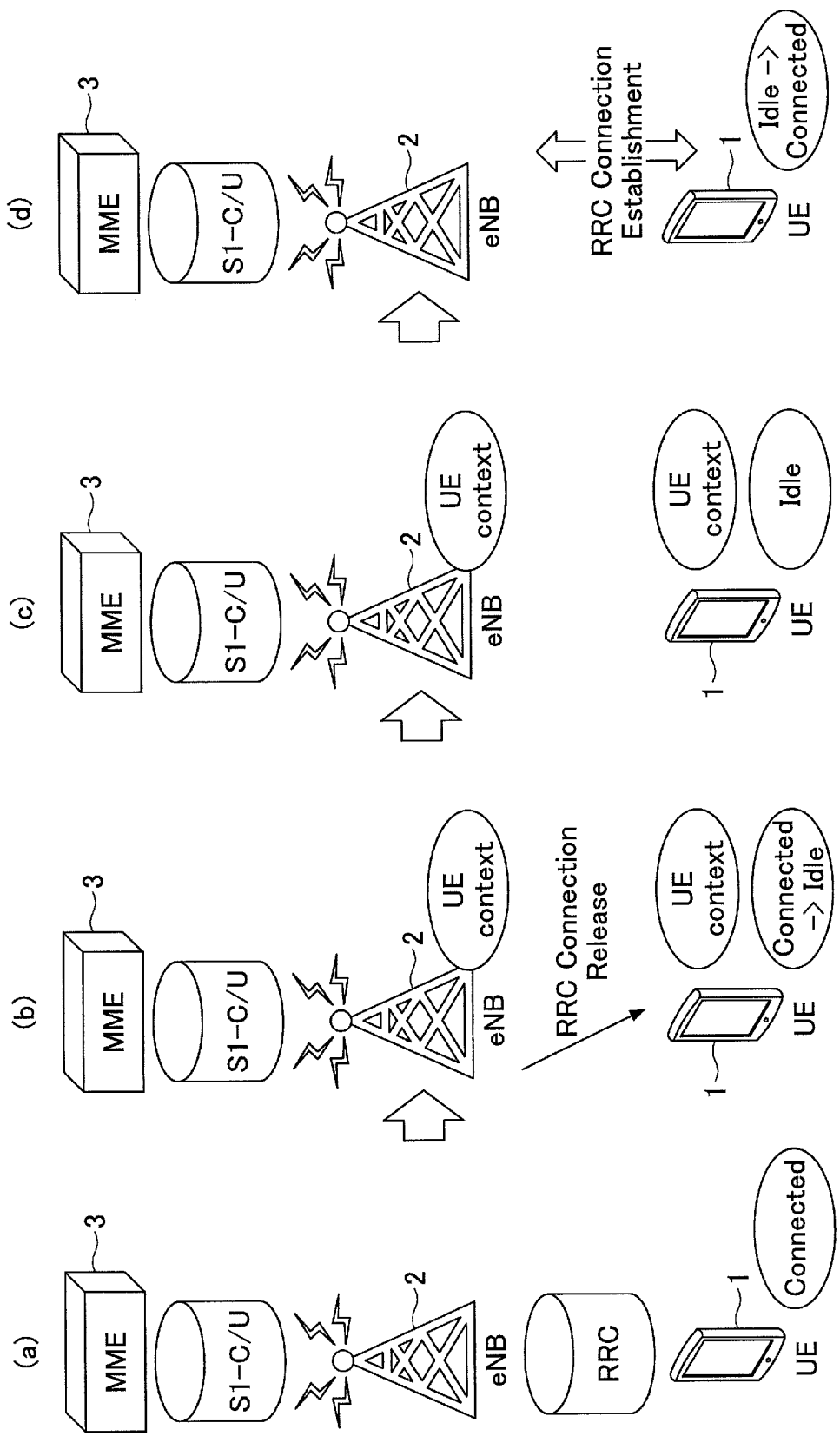
FIG. 2 is a diagram for describing an example of a process of retaining a UE context.
Figure 3:
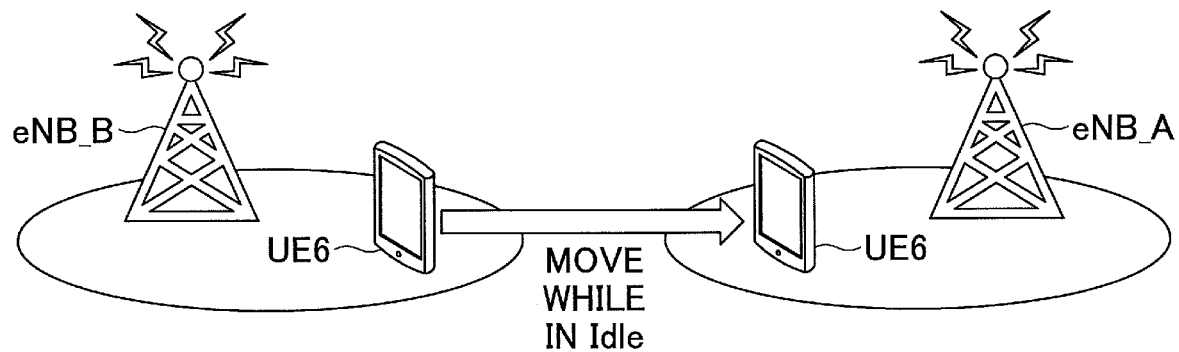
FIG. 3 is a diagram for describing a problem.
Figure 4:
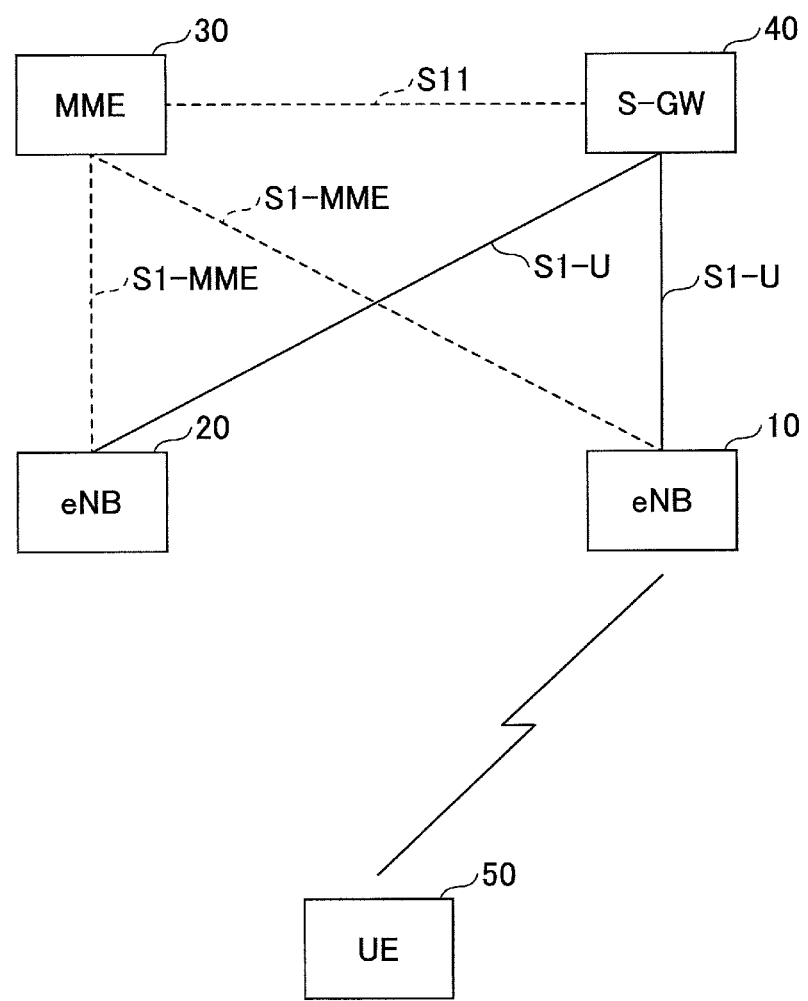
FIG. 4 is a configuration diagram of a communication system according to an embodiment of the present invention.

FIG. 4 is a diagram illustrating an exemplary configuration of a communication system according to an embodiment of the present invention. As illustrated in FIG. 4, a communication system of the present embodiment includes an eNB 10, an eNB 20, an MME 30, an S-GW 40, and a UE 50. FIG. 4 illustrates only parts related to the present embodiment in connection with the core network (EPC).

The UE 50 is a user equipment such as a mobile phone. Each of the eNBs 10 and 20 is a base station. The MME 30 is a node device that accommodates an eNB and performs location registration, paging, mobility control such as handover, bearer establishment/deletion, and the like. Further, C-plane control such as mobility control or bearer establishment/deletion is performed by message transmission and reception of the non-access-stratum (NAS) layer which is a higher layer of the radio resource control (RRC) layer between the UE 50 and the MME 30.

The S-GW 40 is a node device that relays user data (U-plane data). A system including the MME 30 and the S-GW 40 is referred to as a communication control device.

The MME 30 and the S-GW 40 may be configured as a single device and may be referred to as a communication control device.

As illustrated in FIG. 4, the MME 30 and the eNBs 10 and 20 are connected via an S1 MME interface, and the S-GW 40 and the eNBs 10 and 20 are connected via an S1-U interface. Dotted connecting lines indicate control signal interfaces, and solid connecting lines indicate user data transfer interfaces.

The present embodiment is under the assumption of a scheme in which as described above, even when the UE 50 transitions from the RRC connected state to the RRC idle state within the same eNB, the UE context of the UE 50 is retained in the eNB, and the UE context related to the connection with the eNB is also retained in the UE 50. As described above, the number of signals can be reduced through this scheme.

In the present embodiment, as an example of the above scheme, a scheme in which a new RRC state called RRC-Suspended (and ECM-Suspended) which is a scheme described in Non-Patent Document 3 is described is defined will be described as a first embodiment, and a scheme in which the UE context is reused without defining a new RRC state will be described as a second embodiment.

First Embodiment

First, the first embodiment will be described. As described above, in the scheme of the first embodiment, in addition to the conventional RRC-Idle (RRC idle state) and RRC-connected (RRC connected state) of the related art, a state called RRC-Suspended (called an RRC retention state) is added. In the RRC retention state, each of the UE and the eNB retains the UE context used for a connection in the RRC connected state before the RRC retention state. Then, when transition from the RRC retention state to the RRC connected state is performed, the RRC connection establishment is performed using the retained UE context. A detailed procedure and the like are described in Non-Patent Document 3. However, in the present embodiment, the UE can determine whether or not the eNB supports the UE context retention function. Such functions are not described in Non-Patent Document 3 at all.

First Embodiment: Overall Sequence Example

Figure 5:
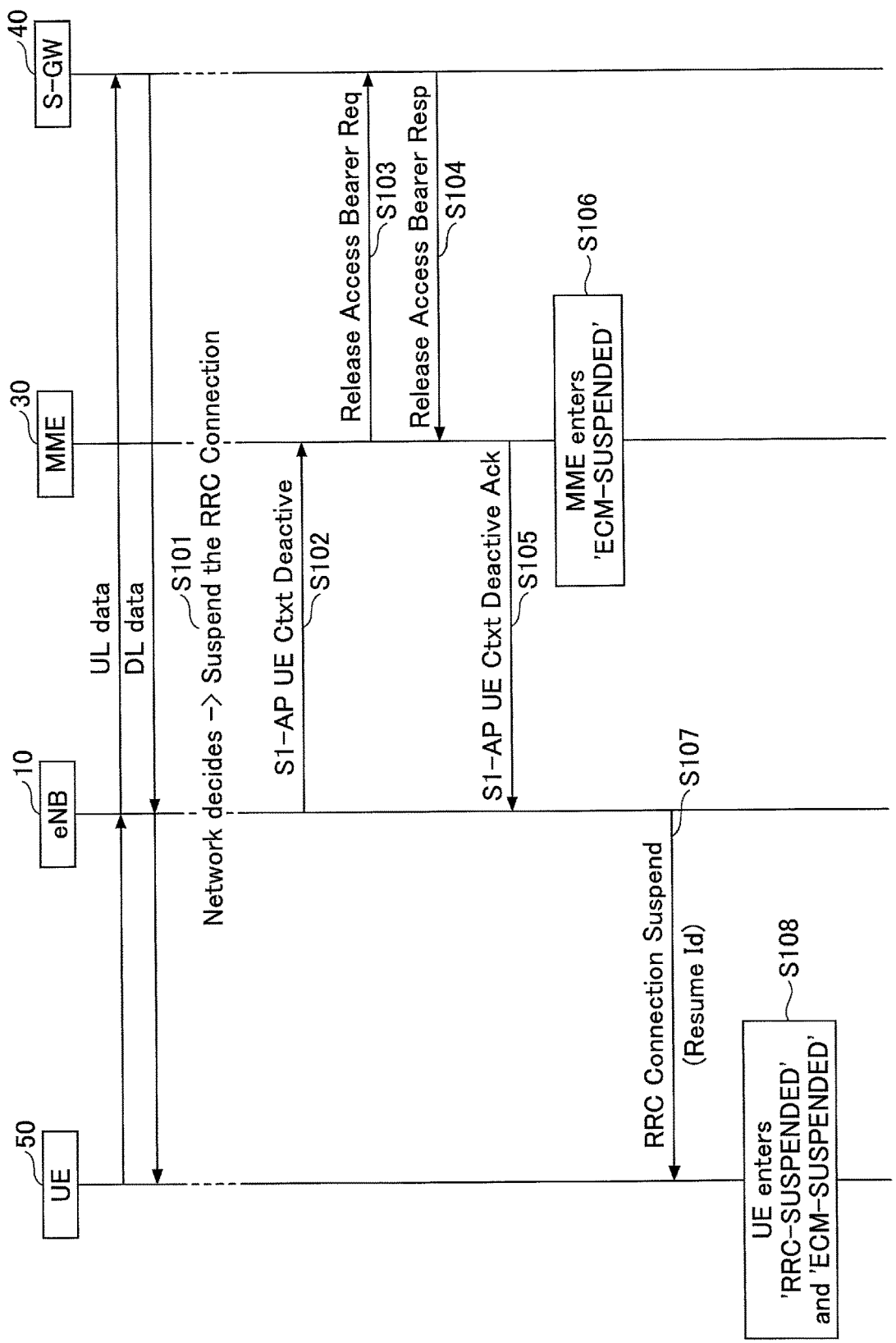
FIG. 5 is a diagram illustrating an example of a processing sequence of the entire system according to a first embodiment.
Figure 6:
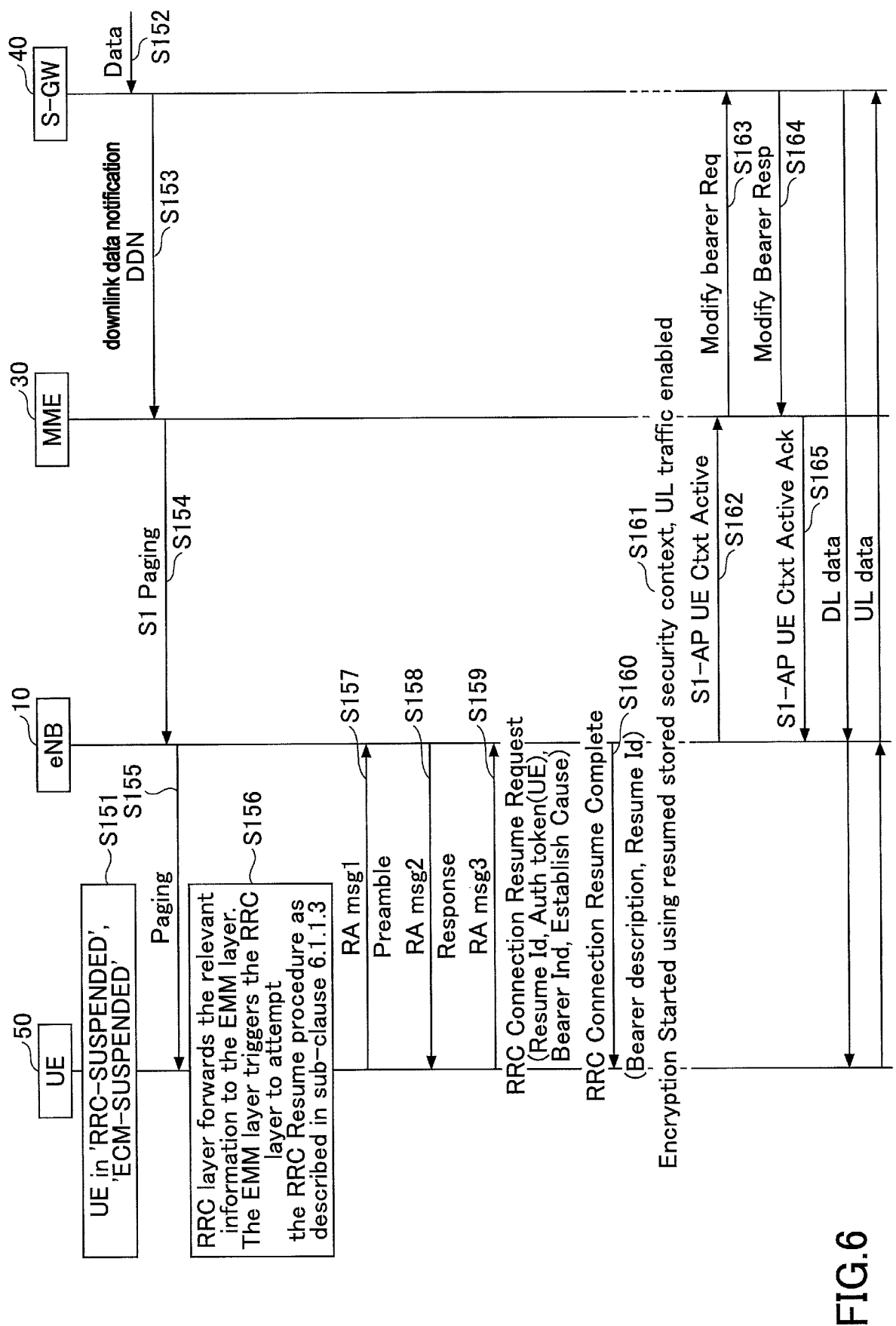
FIG. 6 is a diagram illustrating an example of a processing sequence of the entire system according to the first embodiment.

First, as a sequence example of the entire communication system according to the first embodiment, a processing sequence when the UE 50 transitions from the RRC idle state to the RRC retention state (and the ECM retention state) will be described with reference to FIG. 5. Since the overall processing sequence illustrated in FIGS. 5 and 6 is disclosed in Non-Patent Document 3, an overview will be described here.

In step 101, the eNB 10 decides to retain the RRC connection. In step 102, the eNB 10 transmits a message indicating that the RRC connection of the UE 50 is suspended to the MME 30. The MME 10 and the eNB 30 retain the UE context.

In step 105, the MME 30 transmits Ack with respect to step 102 through messages of steps 103 and 104. In step 106, the MME 30 enters an ECM-SUSPEND state.

In step 107, the eNB 10 transmits an RRC connection suspend message to the UE 50 and causes the UE 50 to transition to the RRC retention state (step 108). A Resume ID is included in the RRC connection suspend message. The Resume ID is an identifier used when the RRC connection is resumed next time. In the RRC retention state, each of the UE 50 and the eNB 10 stores the UE context.

Here, in the present embodiment, the UE context retrained in each of the UE 50 and the eNB 10 includes, for example, an RRC configuration, a bearer configuration (including RoHC state information or the like), an access stratum (AS) security context, L2/L1 parameters (MAC configuration, PHY configuration, and the like), and the like.

Further, the UE 50 and the eNB 10 may retrain the same information as the UE context, and the UE 50 may retrain only information of the UE context that is necessary for the connection with the eNB 10, and the eNB 10 may retain only information of the UE context necessary for the connection with the UE 50.

More specifically, in the RRC idle state, for example, each of the UE 50 and the eNB 10 retains RadioResourceConfigDedicated information carried through the RRC Connection Setup, capability information carried through the RRC Connection Setup Complete, and security-related information (key information or the like), security-related information carried through the RRC Security Mode Command, configuration information carried through the RRC Connection Reconfiguration, and the like as the UE context. These are merely examples, and information retained as the UE context is not limited thereto, and information may be retrained additionally, or some pieces of the information may not be retained.

Since the UE 10 and the eNB 10 retain such information, when transition from the RRC idle state to the RRC connected state is performed, the RRC connection establishment can be performed without performing transmission and reception of messages such as the RRC Connection Setup Complete, the RRC Security Mode Command, the RRC Security Mode Complete, the RRC Connection Reconfiguration, and the RRC Connection Reconfiguration Complete.

Next, a sequence example in which the UE 50 transitions from the RRC retention state to the RRC connected state will be described with reference to FIG. 6. FIG. 6 illustrates an example in which the UE 50 in the RRC retention state (step 151) receives an incoming call (steps 152 to 155), but this is an example, and even when the UE 50 in the RRC retention state originates a call, a similar process is performed for the reuse of the UE context.

In the UE that has received paging from the eNB 10, in step 156, the RRC resume procedure is activated from the EMM layer (a supplier of the NAS layer). In step 157, the Random Access Preamble is transmitted from the UE 50 to the eNB 10, and in Step 158, the Random Access Response is transmitted from the eNB 10 to the UE 10.

In step 159, the UE 50 transmits an RRC Connection Resume Request message to the eNB 10 as a message 3. In the first embodiment, before the RRC Connection Resume Request message is transmitted, the UE 50 performs a process of determining whether or not the eNB 10 has the context retention function, and this process will be described later in detail.

A Resume ID (resume ID) which is information indicating that the UE 50 retrains the UE context is included in the RRC Connection Resume Request message. The eNB 10 that has received the RRC Connection Resume Request message acquires the UE context of the UE 50 stored in association with the Resume ID included in the message, and resumes the bearer or the like on the basis of the information of the UE context. In step 160, the eNB 10 transmits an RRC Connection Resume Complete message including the Resume ID to the UE 50.

In step 161, the UE 50 and the eNB 10 resumes the stored security context. Then, in steps 162 to 165, a notification of the state change of the UE 50 or the like is transmitted to the MME 30.

<UE Context Retention Function Determination>

As described above with reference to FIG. 6 and the like, the UE 50 uses the Resume ID to give the notification that the UE retains the UE context to the eNB 10. This is on the premise that the eNB 10 supports the UE context retention function (the function of performing the RRC connection reusing the retained UE context).

However, all eNBs need not necessarily support the UE context retention function. For example, the UE 50 is assumed to enter the RRC idle state while retaining the UE context under the control of the eNB 10 and moves to a cell of an eNB-X which does not have the UE context retention function. Here, even when a notification of the information indicating that the UE 50 retains the UE context is given to the eNB-X, the eNB-X is unable to detect the information. In order to perform a stable operation, when the UE 50 is able to check that the eNB of the serving cell has the UE context retention function, it is desirable that the UE 50 perform the UE context retention notification operation described in FIG. 6 and the like.

The first embodiment will be described in connection with an example in which the UE 50 determines whether or not the eNB 10 has the UE context retention function. Examples 1-1 to 1-2 will be described below. In the first embodiment and the second embodiment, the "UE context retention function" is a function of establishing the RRC connection from a state other than the RRC connected state using (or reusing) the retained UE context in the state. Further, when the eNB does not have the UE context retention function or when the eNB does not support the UE context retention function correspond to not only when the eNB does not retrain the UE context retention function as its capability but also when the eNB retains the UE context retention function as its capability but stops the function.

EXAMPLE 1-1

In an example 1-1, the eNB 10 broadcasts information indicating whether or not the eNB 10 supports the UE context retention function to the UE 50 through broadcast information. As the broadcast information, for example, an MIB, an SIB1, or an SIB 2 may be used.

An exemplary operation of the UE 50 related to determination of the UE context retention function will be described with reference to a flowchart of FIG. 7. In the following example, the eNB 10 broadcasts information indicating whether or not the eNB 10 supports the UE context retention function using the SIB1.

In step 201, UE 50 receives the SIB1 from the eNB 10. In step 202, the UE 50 reads the information indicating whether or not the eNB 10 supports the UE context retention function from the SIB1, and the UE 50 determines whether or not the eNB 10 supports the UE context retention function on the basis of the information.

When the determination result of step 202 is Yes (supporting), the process proceeds to step S203, and when the UE 50 performs transition to the RRC connected state in the cell, the UE 50 performs the RRC connection by transmitting the RRC Connection Resume Request message to the eNB 10 as described above.

When the determination result of step 202 is NO (not supporting), the process proceeds to step S204, and when the UE 50 performs transition to the RRC connected state in the cell, the UE 50 drops the retained UE context and performs the RRC connection by transmitting the normal RRC Connection Request to the eNB 10.

EXAMPLE 1-2

In an example 1-2, the eNB 10 gives a notification indicating whether or not the eNB 10 supports the UE context retention function to the UE 50 through the Random Access Response in the random access procedure.

An exemplary operation of the UE 50 in the example 1-2 will be described with reference to a flow chart of FIG. 8. Here, for example, as illustrated in FIG. 6, a situation in which the UE 50 in the RRC retention state transitions to the RRC connected state upon receiving paging (or in order to originate a call) is illustrated.

In step 301, the UE 50 transmits a Random Access Preamble to the eNB 10. In step 302, the UE 50 receives a Random Access Response from the eNB 10. The Random Access Response includes information indicating whether or not the eNB 10 supports the UE context retention function.

In step 303, the UE 50 reads the information indicating whether or not the eNB 10 supports the UE context retention function from the Random Access Response, and the UE 50 determines whether or not the eNB 10 supports the UE context retention function on the basis of the information.

When the determination result of step 303 is Yes (supporting), the process proceeds to step S304, and the UE 50 performs RRC connection by transmitting the RRC Connection Resume Request message to the eNB 10 as described above.

When the decision result of step 303 is No (not supporting), the process proceeds to step S305, the UE 50 drops the retained UE context and performs the RRC connection by transmitting the normal RRC Connection Request to the eNB 10.

Figure 9:
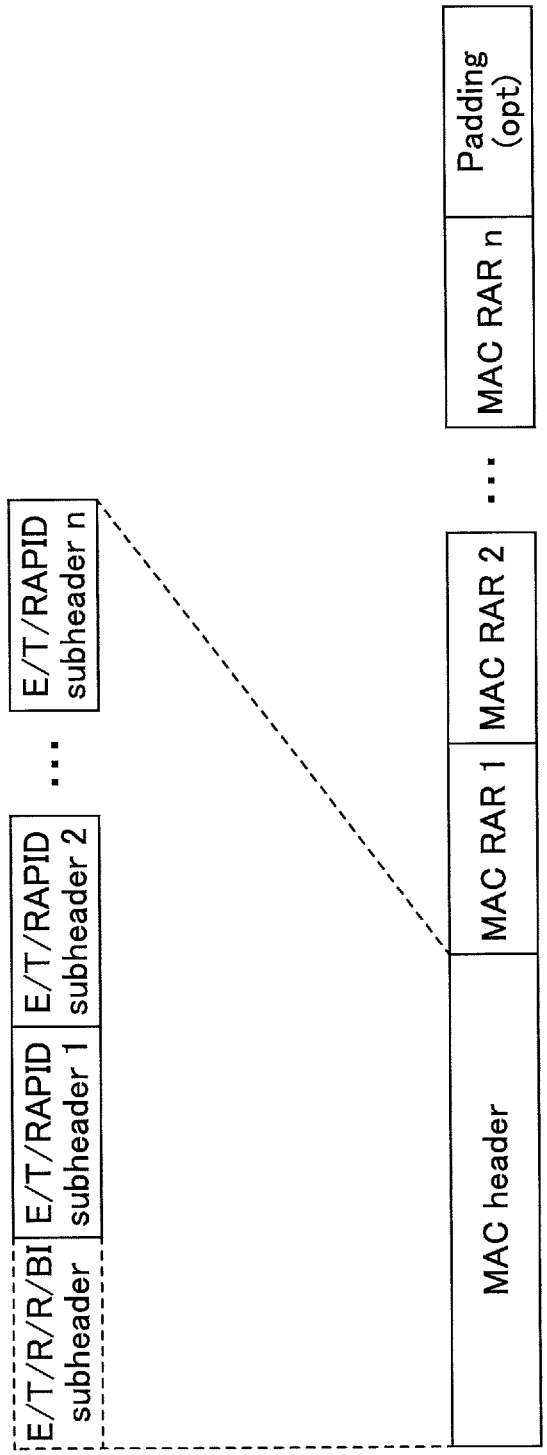
FIG. 9 is a diagram illustrating a message example of a RA response.
Figure 10:
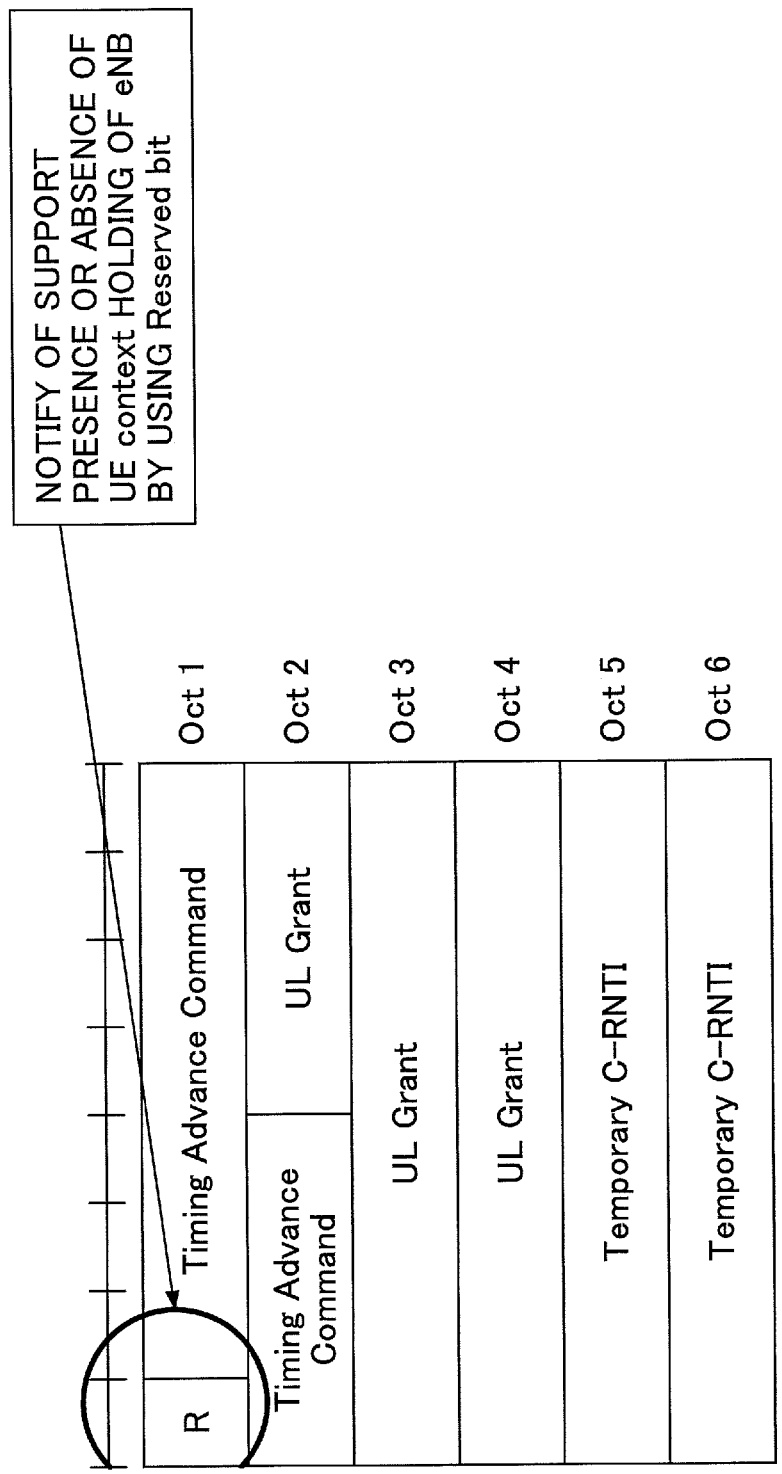
FIG. 10 is a diagram illustrating a message example of a RA response.

FIGS. 9 and 10 illustrate a messages example of the Random Access Response in the example 2 (see Non-Patent Document 5 for an example of a related art). As illustrated in FIG. 9, an MAC RAR is included in an MAC PDU. As illustrated in FIG. 10, in the example 2, the notification of the information indicating whether or not the UE context retention function is supported is given using a reserved bit in the MAC RAR. As an example, a bit of 1 indicates that the UE context retention function is supported, and a bit of 0 indicates that the UE context retention function is not supported. 1 and 0 may be reversed.

Second Embodiment

Next, a second embodiment will be described. As described above, the second embodiment relates to a scheme in which a new state such as RRC-Suspended is not defined, and in the RRC idle state, the UE and the eNB retain the UE context, and when transition to the RRC connected state is performed, the retained UE context is reused, and thus the number of signaling can be reduced.

Overall Sequence Example

First, as a sequence example of the entire communication system according to the second embodiment, a scheme of performing paging from the MME 30 when there is an incoming call to the UE 50 in the RRC idle state is described. More specifically, a processing sequence when the UE 50 is connected to the eNB 10 to enter the RRC connected state, enters the RRC idle state in the cell subordinate to the eNB 10, and then receives an incoming call in the same cell will be described with reference to FIG. 11.

Figure 11:
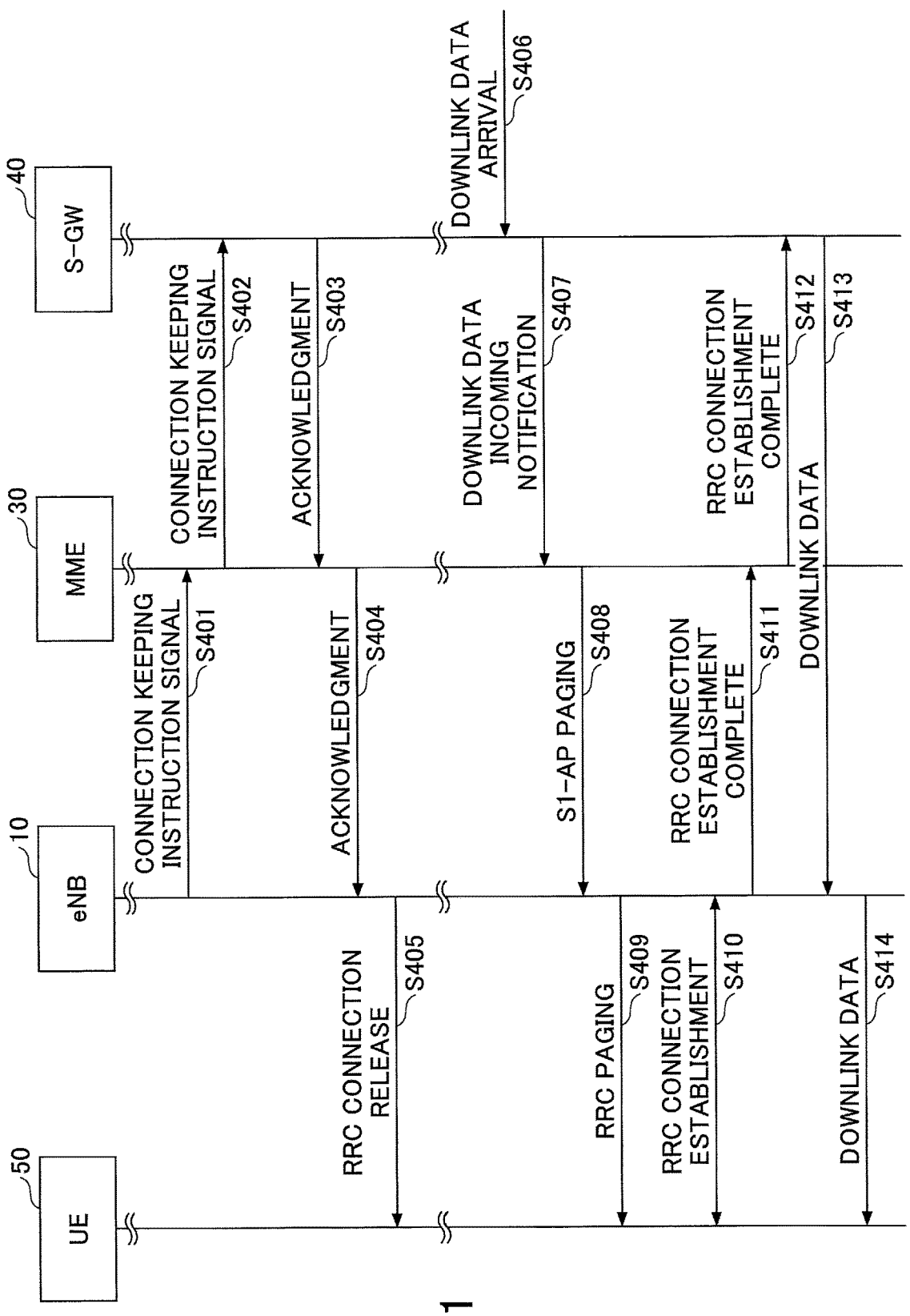
FIG. 11 is a diagram illustrating an example of a processing sequence of the entire system according to a second embodiment.

The process of FIG. 11 is under the assumption that the UE 50 is in the RRC connected state in the cell of the eNB 10, and the S1-C/U connection related to the UE 50 is established. In FIG. 11, the S1-C connection includes a connection between the eNB 10 and the MME 30 and a connection between the MME 30 and the S-GW 40, and the S1-U connection includes a connection between the eNB 10 and the S-GW 40. When the connection is established, transmission and reception of a signal (data) related to the UE 50 can be performed between corresponding node devices without performing a connection setup procedure such as a connection establishment signal.

Before the procedure of FIG. 11 is described, an overview of an example of a procedure when the UE 50 is initially connected to the eNB 10 will be described (Non-Patent Document 4). A procedure related to an initial connection can be applied to the first embodiment. At the time of random access of the UE 50, the eNB 10 transmits an RRC Connection Setup to the UE 50, causes the UE 50 to enter the RRC connected state, and receives an RRC Connection Setup Complete from the UE 50. Thereafter, the eNB 10 receives an Initial Context Setup Request from the MME 30, transmits an RRC Security Mode Command to the UE 50, receives an RRC Security Mode Complete from the UE 50, transmits an RRC Connection Reconfiguration to the UE 50, receives an RRC Connection Reconfiguration Complete from the UE 50, and transmits an Initial Context Setup Response to the MME 30. Through this procedure, the UE context is established and retained in the UE 50 and the eNB 10.

As illustrated in FIG. 11, in the RRC connected state, the eNB 10 transmits a connection retention instruction signal to the MME 30 (step 401). Further, the MME 30 transmits the connection retention instruction signal to the S-GW 40 (step 402).

The connection retention instruction signal is a signal for giving an instruction to retain downlink data in the S-GW 40 when there is an incoming call to the UE 50 while maintaining the S1-C/U connection related to the UE 50 and perform paging from the MME 30.

The S-GW 40 that has received the connection retention instruction signal transmits an acknowledge response indicating that the instruction has been confirmed to the MME 30 (step 403), and the MME 30 transmits an acknowledge response to the eNB 10 (step 404).

The transmission of the connection retention instruction signal related to the UE 50 from the eNB 10 to the MME 30 may be triggered, for example, when an event of causing the UE 50 to transition to the RRC idle state occurs in the eNB 10 or may be performed directly after the UE 50 initially enters the RRC connected state under the control of the eNB 10, and the S1-C/U connection related to the UE 50 is established.

The event of causing the transition to the RRC idle state is, for example, a case in which it is detected that communication with the UE 50 (uplink and downlink user data communication) has not occurred for a certain period of time due to expiration of a predetermined timer (for example, a UE inactivity timer) but is not limited thereto.

In FIG. 11, the case in which it is detected that communication with the UE 50 (uplink and downlink user data communication) has not occurred for a certain period of time is assumed to be a trigger, and after steps 401 to 404, an RRC connection release is transmitted to the UE 50 to cause the UE 50 to transition to the RRC idle state (step 405).

In the second embodiment, even when the UE 50 transitions to the RRC idle state, the UE context established at the time of RRC connection is retained in each of the UE 50 and the eNB 10.

Thereafter, downlink data destined for the UE 50 occurs, and the downlink data arrives at the S-GW 40 (step 406). Here, the S1-U connection has been established, but the S-GW 40 retains the downlink data in a buffer without transferring the downlink data to the eNB 10 on the basis of the connection retention instruction signal received in step 402.

The S-GW 40 transmits a downlink data arrival notification to the MME 30 (step 407), and the MME 30 transmits an S1-AP paging signal destined for the UE 50 to the eNB 10 (step 408). The paging is similar to an existing paging and transmitted to each eNB in a tracking area of the UE 50, but transmission to the eNB 10 is illustrated in FIG. 11.

The eNB 10 that has received the S1-AP paging signal transmits an RRC paging signal to the UE 50 subordinate thereto (step 409).

The UE 50 that has received the RRC paging signal performs an RRC connection establishment procedure and establishes the RRC connection (step 410). Thereafter, the eNB 10 transmits an RRC connection establishment complete which is a signal indicating that the establishment of the RRC connection has been completed to the MME 30 (step 411). The eNB 10 can determine that the RRC connection with the UE 50 has been established, for example, that the eNB 10 has received the RRC Connection Setup Complete from the UE 50.

The MME 30 transmits the RRC connection establishment complete signal to the S-GW 40 (step 412). As a result, the S-GW 40 determines that the RRC connection has been established between the UE 50 and the eNB 10, and starts transfer of the retained downlink data to the eNB 10 using the S1-U connection related to the UE 50 which is already established (Step 413). The downlink data is transferred from the eNB 10 to the UE 50 (step 414). As described above, the transmission of the downlink data to the UE 50 is started.

The RRC connection establishment procedure in step 410 in FIG. 11 will be described later in detail. In the RRC connection establishment procedure, since the UE context established and retained at the time of RRC connection in each of the UE 50 and the eNB 10 is used, the RRC connection establishment can be performed without performing transmission and reception of messages such as the RRC Security Mode Command, the RRC Security Mode Complete, the RRC Connection Reconfiguration, and the RRC Connection Reconfiguration Complete.

Here, the UE context retrained in each of the UE 50 and the eNB 10 includes, for example, an RRC configuration, a bearer configuration (including RoHC state information and the like), an AS security context (Access Stratum Security Context), L2/L1 parameters (the MAC configuration, the PHY configuration, and the like), and the like.

Further, the UE 50 and the eNB 10 may retrain the same information as the UE context, and the UE 50 may retrain only information of the UE context that is necessary for the connection with the eNB 10, and the eNB 10 may retain only information of the UE context necessary for the connection with the UE 50.

More specifically, in the RRC idle state, for example, each of the UE 50 and the eNB 10 retains RadioResourceConfigDedicated information carried through the RRC Connection Setup, capability information carried through the RRC Connection Setup Complete, and security-related information (key information or the like), security-related information carried through the RRC Security Mode Command, configuration information carried through the RRC Connection Reconfiguration, and the like as the UE context. These are merely examples, and information retained as the UE context is not limited thereto, and information may be retrained additionally, or some pieces of the information may not be retained.

Since the UE 10 and the eNB 10 retain such information as the UE context, when transition from the RRC idle state to the RRC connected state is performed, the RRC connection establishment can be performed without performing transmission and reception of messages such as the RRC Security Mode Command, the RRC Security Mode Complete, the RRC Connection Reconfiguration, and the RRC Connection Reconfiguration Complete.

Further, in the second embodiment, the eNB 10 retains the UE context in a storage unit in association with an identifier (UE identifier) of the UE corresponding to the UE context. There is no limitation to a type of UE identifier, but in the second embodiment, an SAE temporary mobile subscriber identity (S-TMSI) is used as the UE identifier as an example.

<Example of RRC Connection Establishment Procedure>

Next, the RRC connection establishment procedure between the UE 50 and the eNB 10 according to the second embodiment will be described with reference to a sequence of FIG. 12. In the sequence illustrated in FIG. 12, the process of step 410 in FIG. 11 is assumed, but the present invention is not limited thereto. For example, the sequence illustrated in FIG. 12 may be the RRC connection establishment procedure at the time of call origination from the UE 50.

Figure 12:
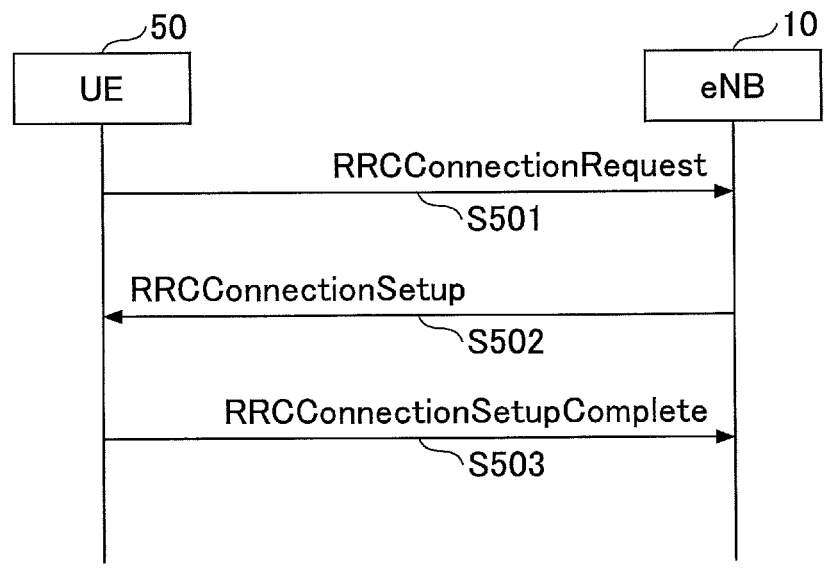
FIG. 12 is a diagram for describing a connection establishment procedure according to the second embodiment.

It is assumed that before the sequence illustrated in FIG. 12, a Random Access Preamble is transmitted from the UE 50 to the eNB 10, and a Random Access Response is transmitted from the eNB 10 to the UE 50.

In step S01, the UE 50 transmits the RRC Connection Request message (RRC connection request) to the eNB 10 through resources allocated by the UL grant included in the Random Access Response. In the second embodiment, in step S01, the UE 50 gives a notification indicating that the UE 50 retains the UE context using a spare bit (1 bit) in the RRC Connection Request message to the eNB 10. For example, when the bit is set (1), it indicates that the UE 50 retains the UE context. The information indicating that the UE 50 retains the UE context is referred to as "UE context retention information."

Further, in addition to the above bit, a UE identifier (specifically, the S-TMSI) identifying the UE 50 is included in the RRC Connection Request message. The S-TMSI is a temporary identifier of the UE 50 generated from an identifier specific to the UE 50 and output from the MME 30 at the time of location registration of the UE 50 or the like. In the present embodiment, it is assumed that the UE 50 and each eNB are assumed to retrain the S-TMSI identifying the UE 50.

The eNB 10 that has received the RRC Connection Request message in step S01 reads the UE context retention information and the UE identifier from the message, recognizes that the UE 50 identified by the UE identifier retains the UE context, and searches for the UE context corresponding to the UE identifier among a plurality of retained UE contexts from the storage unit. In other words, a UE identifier matching process is performed.

In step S02, When the UE context corresponding to the UE identifier is detected as a result of search, the eNB 10 gives a notification indicating that the eNB 10 retains the UE context of the UE 50 to the UE 50 through the RRC Connection Setup message (RRC connection establishment message) and requests the UE 50 to transmit information for authentication of the UE 50.

The UE 50 that has received the RRC Connection Setup message including the information indicating that the UE context of the UE 50 is retained continuously uses the retained UE context (the bearer, the security key, the configuration, and the like).

Further, the RadioResourceConfigDedicated included in the RRC Connection Setup message includes parameter values related to the bearer, the MAC configuration, the PHY configuration, and the like, but the UE 50 that has received the RRC Connection Setup message including the above notification and request in step 202 ignores parameter values notified of through the RadioResourceConfigDedicated and continuously uses the parameter values of the retained UE context. The parameter values which are notified of may be used without ignoring the parameter values notified of through the RadioResourceConfigDedicated. As a result, when the parameter values which are already retained are changed by the eNB 10, the change can be reflected.

Next, in step S03, the UE 50 includes authentication information such as an Authentication token, a shortMAC-I, and the like in the RRC Connection Setup Complete message, and transmits the resulting RRC Connection Setup Complete message to the eNB 10. The authentication information such as the Authentication token and the short MAC-I is information used for the eNB 10 to authenticate the UE 50.

The eNB 10 that has received the RRC Connection Setup Complete message authenticates that the UE 50 is a correct UE corresponding to the UE context searched using the UE identifier using the authentication information included in the message. Thereafter, the UE 50 and the eNB 10 establish (resume) a connection using the retained UE contexts. Further, when the connection is established (resumed) using the retained UE context, step S03 need not be necessarily performed, and step S03 may not be performed.

<Example of RRC Connection Release Procedure>

In the second embodiment, when the UE 50 receives the RRC Connection Release message from the eNB 10 and performs transition to the RRC idle state, the UE context may be constantly retrained, or the UE context may be retrained only when information for giving an instruction to retain the UE context is included in the RRC Connection Release message. An example of the latter will be described below.

Figure 13:
FIG. 13 is a diagram for describing a connection release procedure according to the second embodiment.

As illustrated in FIG. 13, when the eNB 10 causes the UE 50 to transition to the RRC idle state, the eNB 10 transmits the RRC Connection Release message to the UE 50 (step 601).

The RRC Connection Release message includes instruction information (indication) for instructing the UE 50 to continuously retain the UE context in the RRC idle state. For the instruction information, a new indication may be included in the message, or a spare bit of an existing release cause may be used. A specific example will be described later.

When the instruction information is detected from the RRC Connection Release message, the UE 50 continuously retrains the UE context at the time of transition of the RRC idle state (the bearer information, the security information, and the like) in the RRC idle state.

(Another Example of Processing Sequence of Entire System)

In the examples illustrated in FIG. 11, the UE 10 performs transition between the RRC connected state and the RRC idle state under the same eNB 10, but here, as another example, a process sequence when the UE 50 is connected to the eNB 10 to enter the RRC connected state and enters the RRC idle state in the cell subordinate to the eNB 10, and thereafter, the UE 50 moves to a cell subordinate to the eNB 20 and receives an incoming call will be described with reference to FIG. 14.

Figure 14:
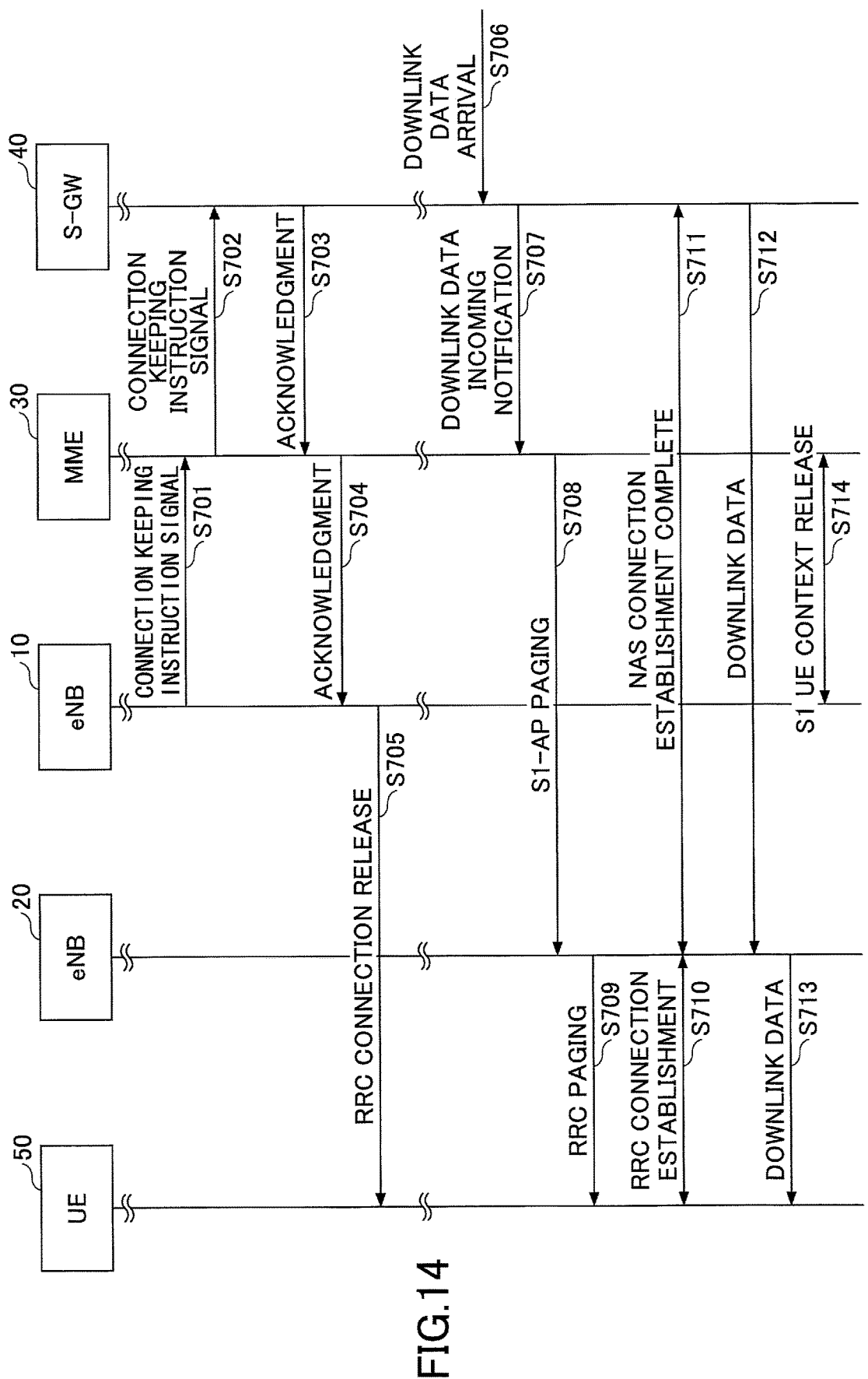
FIG. 14 is a diagram illustrating another example of a processing sequence of the entire system according to the second embodiment.

Further, the example of FIG. 14 is also under the assumption that the UE 50 is in the RRC connected state in the cell of the eNB 10, and the connection of the S1-C/U is established.

Similarly to the examples of FIG. 11, the eNB 10 transmits the connection retention instruction signal to the MME 30 (step 701). Further, the MME 30 transmits the connection retention instruction signal to the S-GW 40 (step 702).

As described above, the connection retention instruction signal is a signal for giving an instruction to retain downlink data in the S-GW 40 when there is an incoming call to the UE 50 while maintaining the S1-C/U connection related to the UE 50 and perform paging from the MME 30.

The S-GW 40 that has received the connection retention instruction signal transmits an acknowledge response to the MME 30 (step 703), and the MME 30 transmits an acknowledge response to the eNB 10 (step 704).

After steps 701 to 704, the eNB 10 transmits the RRC connection release to the UE 50, and causes the UE 50 to transition to the RRC idle state (step 705). After this, the UE 50 moves to the cell subordinate to the eNB 20. The RRC Connection Release message includes an instruction to retention the UE context, and the UE 50 retains the UE context. However, the UE context is information used for the connection with the eNB 10.

Thereafter, the downlink data destined for the UE 50 occurs, and the downlink data arrives at the S-GW 40 (step 706). Here, the S1-U connection has been established, but the S-GW 40 retains the downlink data in a buffer without transferring the downlink data to the eNB 10 on the basis of the connection retention instruction signal received in step 402.

The S-GW 40 transmits a downlink data arrival notification to the MME 30 (step 707), and the MME 30 transmits an S1-AP paging signal destined for the UE 50 to the eNB 10 (step 708). The paging is similar to an existing paging and transmitted to each eNB (each of one or more eNBs) in a tracking area of the UE 50, but transmission to the eNB 10 is illustrated in FIG. 14.

The eNB 10 that has received the S1-AP paging signal transmits an RRC paging signal to the UE 50 subordinate thereto (step 709).

The UE 50 that has received the RRC paging signal performs an RRC connection establishment procedure and establishes the RRC connection (step 710). Further, the NAS connection procedure is performed between the eNB 20 and the core NW side (the S-GW 40 in FIG. 14), and the S1-C/U connection for the eNB 20 is established (step 711).

Since the connection between the UE 50 and the S-GW 40 is accordingly established, the S-GW 40 starts transmission of the downlink data to the UE 50 (steps 712 and 713). Further, the UE context between the eNB 10 and the MME 30 is released, and the S1-C/U connection for the eNB 10 is released (step 714).

In the above example, in the RRC connection establishment procedure of step 710, the UE 50 transmits the message of step S01 of FIG. 12, but since the eNB 20 determines that the UE context corresponding to the UE 50 is not retained, a normal RRC connection procedure is performed. Alternatively, when the eNB 20 determines that the UE context corresponding to the UE 50 is not retained, the eNB 20 may acquire the UE context of the UE 50 from the eNB 10 on the basis of a PCI (a cell ID identifying the eNB 10 of the cell for which the UE 50 retains the UE context) or the like reported from the UE 50 through the message in the RRC connection establishment procedure and perform the RRC connection using the UE context.

<Specification Modifications>

Next, description examples (excerpts) of the 3GPP specification (3GPP TS 36.331 and Non-Patent Document 3) when various kinds of notifications described with reference to FIGS. 12 and 13 are given are illustrated in FIGS. 15 to 19. In FIG. 15 to FIG. 19, parts changed from Non-Patent Document 3 are underlined.

FIG. 15A illustrates an example of the RRC Connection Request message transmitted from the UE 50 in step S01 of FIG. 12. As illustrated in FIG. 15A, ue-ContextStoring (for example, one bit) is added. As illustrated in FIG. 15B, ue-ContextStoring is information indicating that the UE 50 retains the UE context used in a previous RRC connection. Further, as illustrated in FIG. 15A, the S-TMSI is included.

FIG. 16A illustrates an example of the RRC Connection Setup message transmitted from the eNB 10 in step S02 of FIG. 12. As illustrated in FIG. 16A, ue-ContextStored and ue-AuthenticationInfoReq are added.

As illustrated in FIG. 16B, ue-AuthenticationInfoReq is information for requesting the UE to transmit the authentication information. ue-ContextStored is information indicating that the eNB retains the UE context of the UE which is the target of the RRC Connection Setup. When the presence of this information (field) is detected, the UE ignores a radioRecourceConfigDedicated field notified of through the RRC Connection Setup message. As described above, the parameter values which are notified of through this may be applied without ignoring the radioRecourceConfigDedicated field.

FIG. 17 illustrates an example of the RRC Connection Setup Complete message transmitted from the UE 50 in step S03 of FIG. 12. As illustrated in FIG. 17, ue-AuthenticationToken and ue-AuthenticationInfo which are the authentication information are added.

FIGS. 18 to 19 illustrate examples 1 and 2 of the RRC Connection Release message transmitted from the eNB 10 in step 601 of FIG. 13.

FIGS. 18A and 18B illustrate an example (example 1) of giving a UE context retention instruction using a Cause value. In this case, as illustrated in FIG. 18A, UEcontextHolding is added in ReleaseCause. As illustrated in FIG. 18B, a value of ue-Context Holding indicates an instruction to cause the UE to continuously retain the UE context in the RRC idle state.

FIGS. 19A and 19B illustrate an example (example 2) of giving a UE context retention instruction using a new indication. As illustrated in FIG. 19A, ue-Context Holding is added as the new indication. As illustrated in FIG. 19B, ue-Context Holding indicates an instruction to cause the UE to continuously retain the UE context in the RRC idle state.

<UE Context Retention Function Determination>

As described above with reference to FIG. 12 or the like, in the second embodiment, a notification indicating that the UE 50 retains the UE context is given to the eNB 10. It is under the assumption that the eNB 10 supports UE context retention function (the function of performing the reconnection reusing the retained UE context).

However, as described above in the first embodiment, all eNBs need not necessarily support the UE context retention function. For example, the UE 50 is assumed to enter the RRC idle state while retaining the UE context under the control of the eNB 10 and moves to a cell of an eNB-X which does not have the UE context retention function. Here, even when a notification of the information indicating that the UE 50 retains the UE context is given to the eNB-X, the eNB-X is unable to detect the information. In order to perform a stable operation, when the UE 50 is able to check that the eNB of the serving cell has the UE context retention function, it is desirable that the UE 50 perform the UE context retention notification operation described in FIG. 12 and the like.

An example in which the UE 50 determines whether or not the eNB 10 has the UE context retention function will be described below. Examples 1 to 3 will be described below.

EXAMPLE 2-1

In an example 2-1, the eNB 10 broadcasts information indicating whether or not the eNB 10 supports the UE context retention function to the UE 50 through broadcast information. As the broadcast information, for example, an MIB, an SIB1, or an SIB 2 may be used.

An exemplary operation of the UE 50 related to determination of the UE context retention function will be described with reference to a flowchart of FIG. 20. In the following example, the eNB 10 broadcasts information indicating whether or not the eNB 10 supports the UE context retention function using the SIB1.

In step 801, UE 50 receives the SIB1 from the eNB 10. In step 802, the UE 50 reads the information indicating whether or not the eNB 10 supports the UE context retention function from the SIB1, and the UE 50 determines whether or not the eNB 10 supports the UE context retention function on the basis of the information.

When the determination result of step 802 is Yes (supporting), the process proceeds to step S803, and when the UE 50 performs transition to the RRC connected state, the procedure described with reference to FIG. 12 and the like is performed. In other words, the UE 50 gives a notification of the information indicating that the UE context is retained.

When the determination result of step 802 is No (not supporting), the process proceeds to step S804, and when the UE 50 performs transition to the RRC connected state, the UE 50 drops the retained UE context and transmits the normal RRC Connection Request which does not use a spare bit or the like to the eNB 10.

EXAMPLE 2

In an example 2-2, the eNB 10 gives a notification indicating whether or not the eNB 10 supports the UE context retention function to the UE 50 through the Random Access Response in the random access procedure.

An exemplary operation of UE 50 in the example 2-2 will be described with reference to a flowchart of FIG. 21. Here, for example, a situation in which the UE 50 in the RRC idle state transitions to the RRC connected state upon receiving paging (or in order to originate a call) is illustrated.

In step 901, the UE 50 transmits a Random Access Preamble to the eNB 10. In step 902, the UE 50 receives a Random Access Response from the eNB 10. The Random Access Response includes information indicating whether or not the eNB 10 supports the UE context retention function.

In step 903, the UE 50 reads the information indicating whether or not the eNB 10 supports the UE context retention function from the Random Access Response, and the UE 50 determines whether or not the eNB 10 supports the UE context retention function on the basis of the information.

When the determination result of step 903 is Yes (supporting), the process proceeds to step S904, and the UE 50 performs the procedure described in FIG. 12 and the like. In other words, the UE 50 gives a notification of information indicating that the UE context is retained or the like.

When the determination result of step 903 is No (not supporting), the process proceeds to step S905, and the UE 50 drops the retained UE context and transmits the normal RRC Connection Request that does not use a spare bit to the eNB 10.

The message example of the Random Access Response in the example 2-2 is similar to that of the example 1-2 which is illustrated in FIGS. 9 and 10.

EXAMPLE 2-3

In the example 2-3, the UE 50 determines whether or not the UE context retention function is supported in the eNB 10 in accordance with whether or not ue-ContextStored (the information indicating that the eNB 10 retains the UE context corresponding to the UE 50) is included in the RRC Connection Setup message.

In other words, in the example 2-3, the UE 50 constantly gives the notification indicating that the UE context is retained to the eNB through the RRC Connection Request, and performs the operation illustrated in FIG. 12. However, here, it is determined whether or not the UE context retention function is supported in the eNB 10 on the basis of the RRC Connection Setup message.

An exemplary operation of UE 50 in the example 2-3 will be described with reference to a flowchart of FIG. 22. For example, when the UE 50 in the RRC idle state desires to transition to the RRC connected state, in step 1001, the UE 50 transmits the RRC Connection Request message including the information indicating that the UE context is retained to the eNB 10.

In step 1002, the UE 50 receives the RRC Connection Setup message from the eNB 10. In step 1003, the UE 50 determines whether ue-ContextStored is included in the RRC Connection Setup message, and when the determination result is Yes (included), the UE 50 proceeds to step 1004, whereas when the determination result is No (not included), the process proceeds to step 1005.

In step 1004, the UE 50 continues to use the retained UE context, and transmits the RRC Connection Setup Complete message similar to step S03 in FIG. 12 to the eNB 10.

In step 1005, the UE 50 drops the retained UE context, creates a UE context (the bearer, the MAC config, the PHY config, and the like) by reflecting a set value in the RadioResourceConfigDedicated included in the RRC Connection Setup message, and uses the UE context for the connection (communication) with the eNB 50. After step 1005, the normal RRC connection procedure is performed.

(Modification)

Next, a modification which can be applied to both the first embodiment and the second embodiment will be described.

As described above, in the present embodiment, it is possible to give the notification indicating whether or not the eNB 10 supports the UE context retention function to the UE 50 using a signal such as the SIB1 or the SIB 2.

Meanwhile, a scheme in which data is transmitted and received through a signaling radio bearer (SRB) in the C-plane under the assumption of the application to Internet of things (IoT) or the like in which a small amount of data is transmitted and received, and thus the signaling amount is reduced has been proposed (corresponding to Solution 2 of Non-Patent Document 3: Infrequent small data transmission using pre-established NAS security). Here, this scheme is referred to as an "SRB scheme," "cp CIoTEPSOptimisation," "Control plane CIoT EPS Optimisation," or a "C-plane solution."

On the other hand, a scheme in which the signaling amount is reduced by retaining the UE context while performing transmission and reception of data in the U-plane (DRB) and reusing the UE context as in the methods described in the first embodiment and the second embodiment or the method proposed as "Solution 18: User plane based solution with AS information stored in RAN" in Non-Patent Document 3 has been proposed. This scheme is a solution in the U-plane. Here, this scheme is referred to as a "DRB scheme," a "U-plane solution," a "User plane CIoT EPS Optimisation," or "upCIoTEPSOptimisation."

In the present modification, a notification indicating whether or the eNB 10 supports the "C-plane solution" or the "U-plane solution" is given to the UE 50. A signal used for the notification is not limited to a specific signal, but in the present modification, the SIB 2 is used.

FIGS. 23 and 24 illustrate a specification modification (excerpt) of the SIB 2 according to the present modification. FIGS. 23 and 24 illustrate changes from Non-Patent Document 4, and changed parts are underlined. As illustrated in FIG. 23, "cpCIoTEPSOptimisationAllowed" and "upCIoTEPSOptimisationAllowed" are added. As illustrated in FIG. 24, "cpCIoTEPSOptimisationAllowed" indicates whether or not the UE can perform a connection with "Control planeCooTEPSOptimisation."

In other words, it indicates whether or not the network (eNB) supports "Control planeCooTEPSOptimisations."

"UpCIoTEPSOptimisationAllowed" indicates whether or not the UE can perform a connection with "UserplaneCIoTEPSOptimisation."

In other words, it indicates whether or not the network (eNB) supports "User plane CIoT EPS Optimisation."

In the present modification, the UE 50 is assumed to support both functions of "Control plane CIoT EPS Optimisation" and "User Plane CIoT EPS Optimisation."

<Exemplary Operation 1>

An exemplary operation 1 of the UE 50 when the UE 50 receives the SIB 2 from the eNB 10 in a modification will be described with reference to a flowchart of FIG. 25, and respective steps of the flow of FIG. 25 will be described in a specification modification which will be described later with reference to FIG. 27. FIG. 25 illustrates an operation at the time of cell selection of the UE 50. However, the present invention is not limited to the operation at the time of cell selection.

In step S10, the UE 50 is in the RRC_IDLE state or the RRC_CONNECTED stat and in a state in which a timer T311 is activated (for example, a state in which a cell selection process is being performed due to a link failure). In step S11, the UE 50 performs access in accordance with the scheme of "control plane CIoT EPS optimization."

In step S12, the UE 50 determines whether or not "cpCIoTEPSOptimisation ALLOWED" is included in the SIB 2. In other words, the UE 50 determines whether or not the eNB 10 supports the scheme of "control plane CIoT EPS optimization."

When a determination result of step S12 is Yes, the process proceeds to step S13, and the UE 50 accesses the cell (eNB 10) without using the scheme of "control plane CIoT EPS optimization."

For example, the UE 50 performs access in accordance with "User plane CIoT EPS Optimisation" or a scheme of a related art (for example, a scheme including NAS connections such as S710 and S711 in FIG. 14). For example, when "User plane CIoT EPS Optimisation" is used, the UE 50 performs the processes illustrated in FIGS. 7 and 8, or the processes illustrated in FIGS. 20 to 22.

When the determination result of step S12 is No, the process proceeds to step S14, and the UE 50 accesses the cell (eNB 10) using the scheme of "control plane CIoT EPS optimization."

In this example, the mobile communication system according to the present embodiment is assumed to support "Solution 2: Infrequent small data transmission using pre-established NAS security" of Non-Patent Document 3, and the UE 50 performs an access procedure conforming to Solution 2.

<Exemplary Operation 2>

Figure 26:
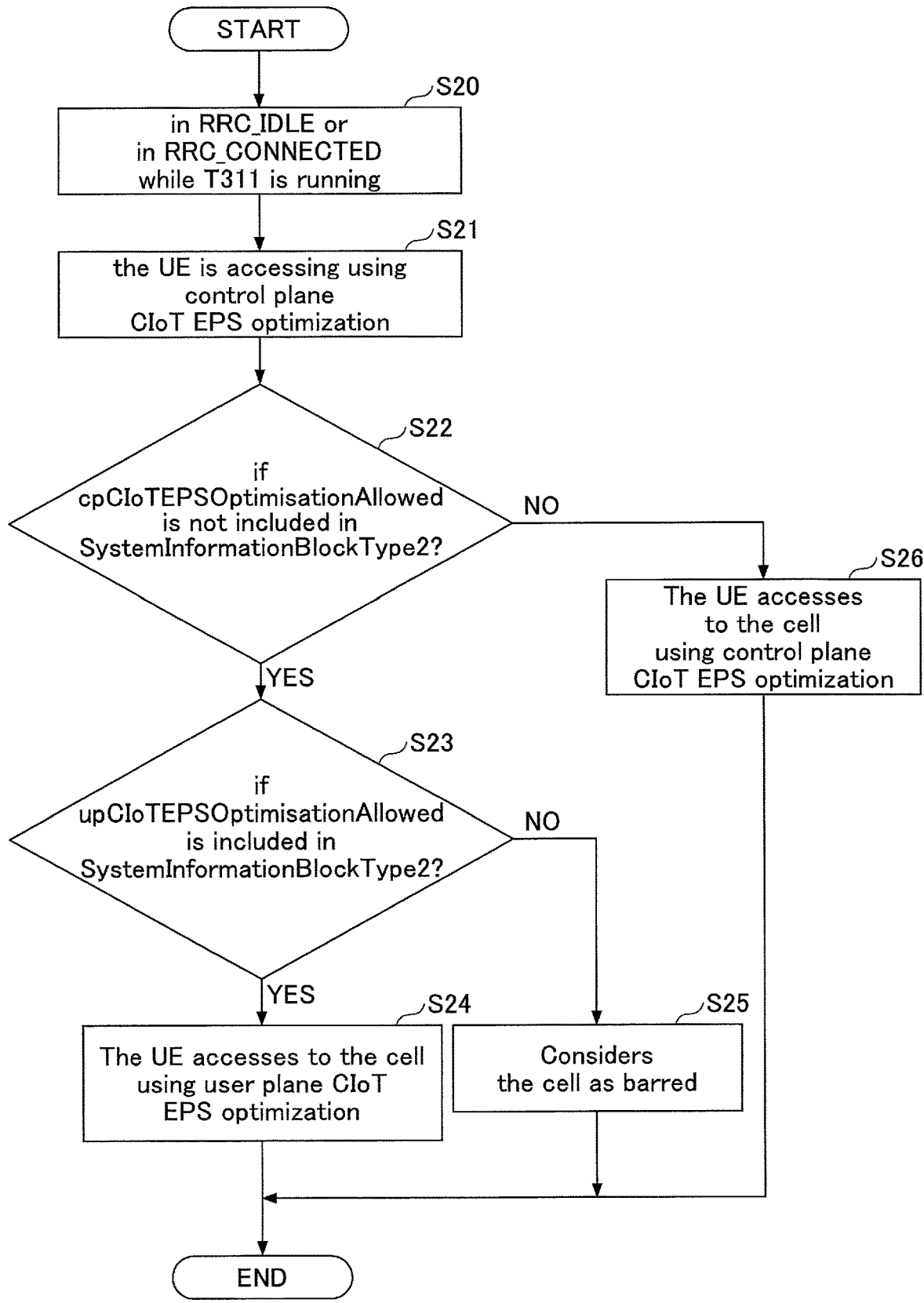
FIG. 26 is a flow chart for describing an exemplary operation 2 of a UE when an SIB 2 is received.

Next, an exemplary operation 2 of the UE 50 when the UE 50 receives the SIB 2 from the eNB 10 in a modification will be described with reference to a flowchart of FIG. 26, and respective steps of the flow of FIG. 26 will be described in a specification modification which will be described later with reference to FIG. 28. FIG. 26 illustrates an operation at the time of cell selection of the UE 50. However, the present invention is not limited to the operation at the time of cell selection.

Steps S20 and S21 are the same as steps S10 and S11 of the exemplary operation 1.

In step S22, the UE 50 determines whether or not "cpCIoTEPSOptimisationAllowed" is included in the SIB2. In other words, the UE 50 determines whether or not the eNB 10 supports the scheme of "control plane CIoT EPS optimization."

When the determination result of step S22 is Yes, the process proceeds to step S23, and the UE 50 determines whether or not "upCIoTEPSOptimisationALLowed" is included in the SIB2. In other words, the UE 50 determines whether or not the eNB 10 supports the scheme of "User plane CIoT EPS optimization."

When the determination result of step S23 is Yes, the process proceeds to step S24, and the UE 50 accesses the cell in accordance with the scheme of "User plane CIoT EPS Optimisation."

Figure 7:
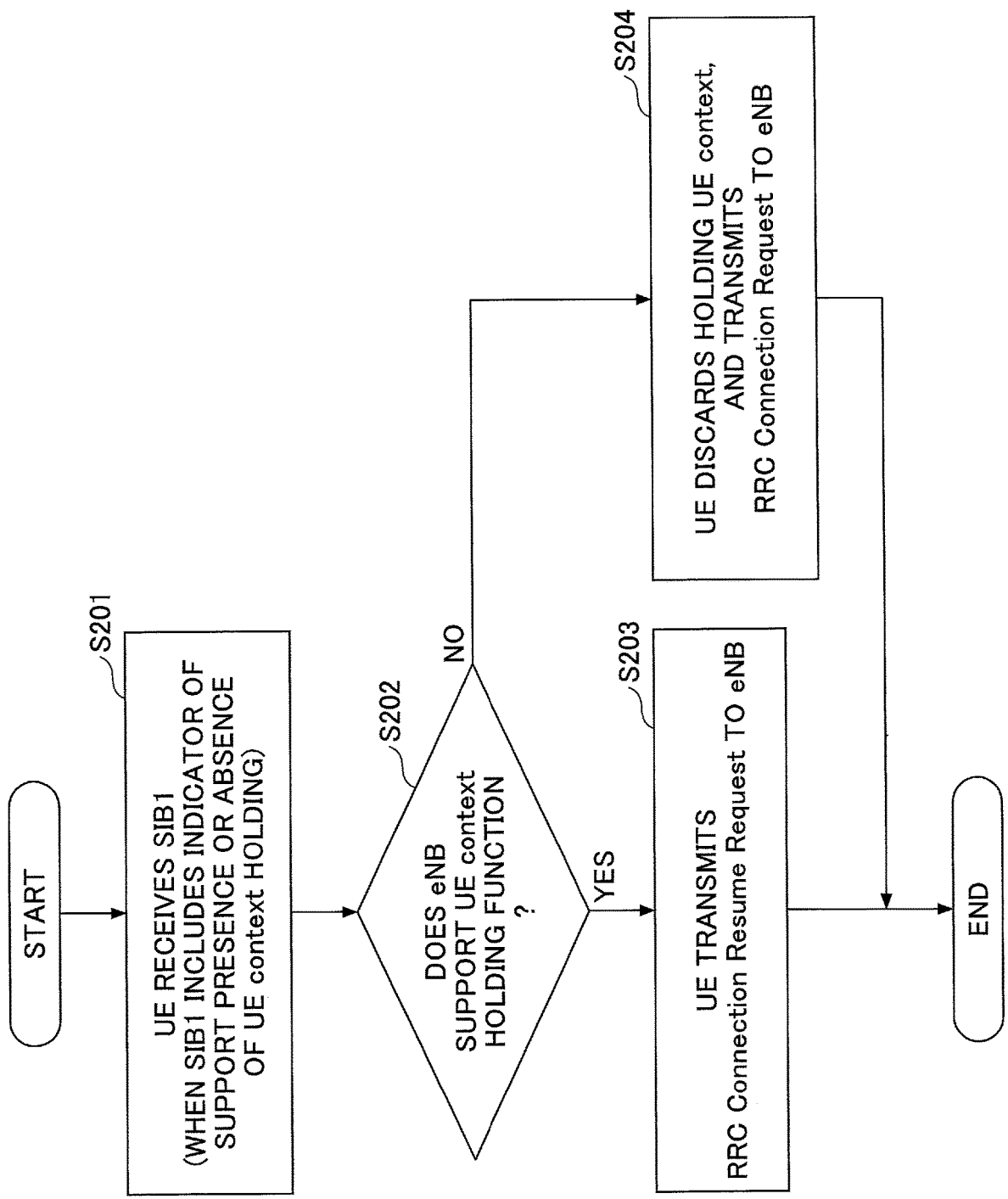
FIG. 7 is a flowchart for describing an exemplary operation of a UE according to the first embodiment.
Figure 8:
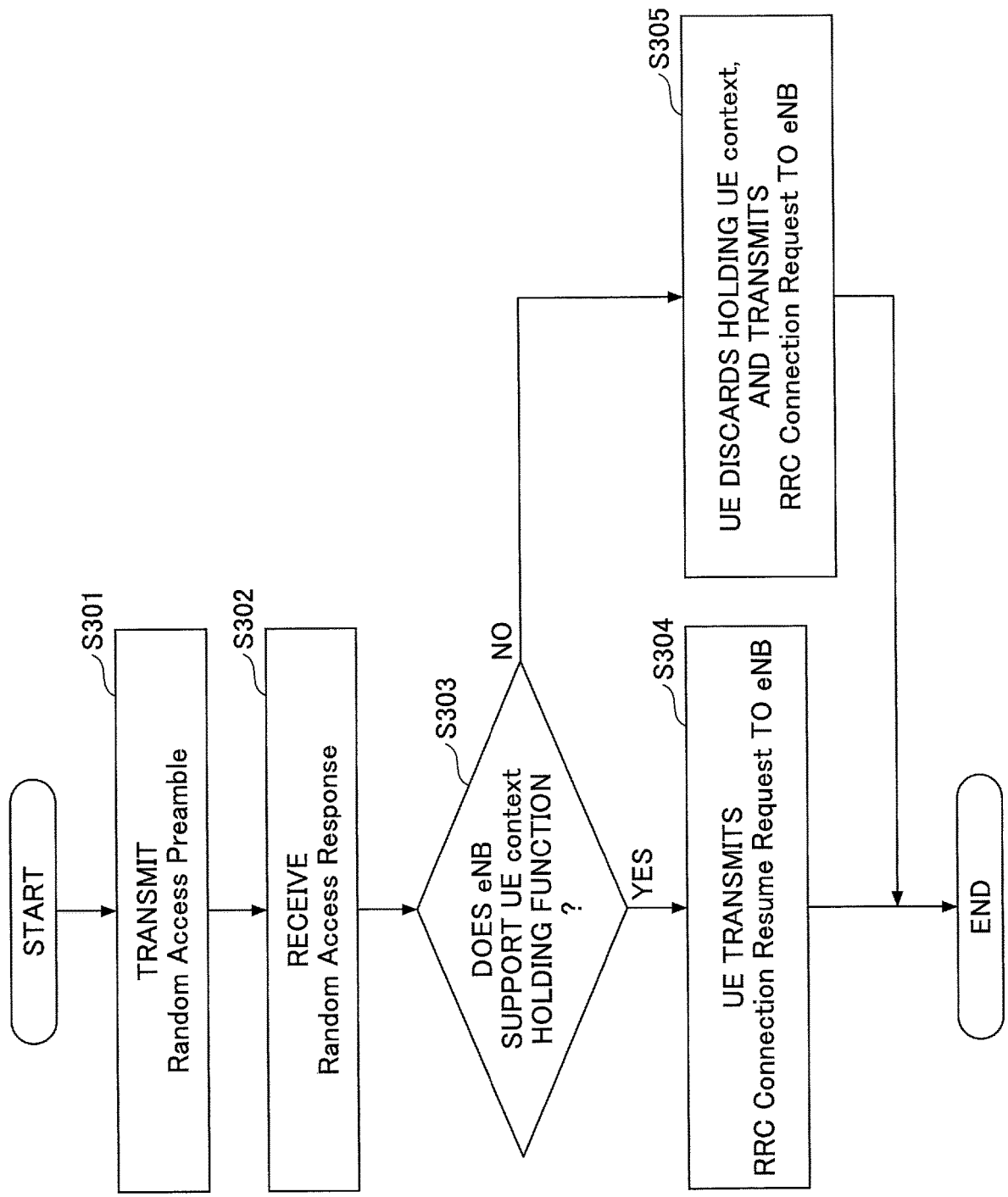
FIG. 8 is a flow chart for describing an exemplary operation of a UE according to the first embodiment.
Figure 20:
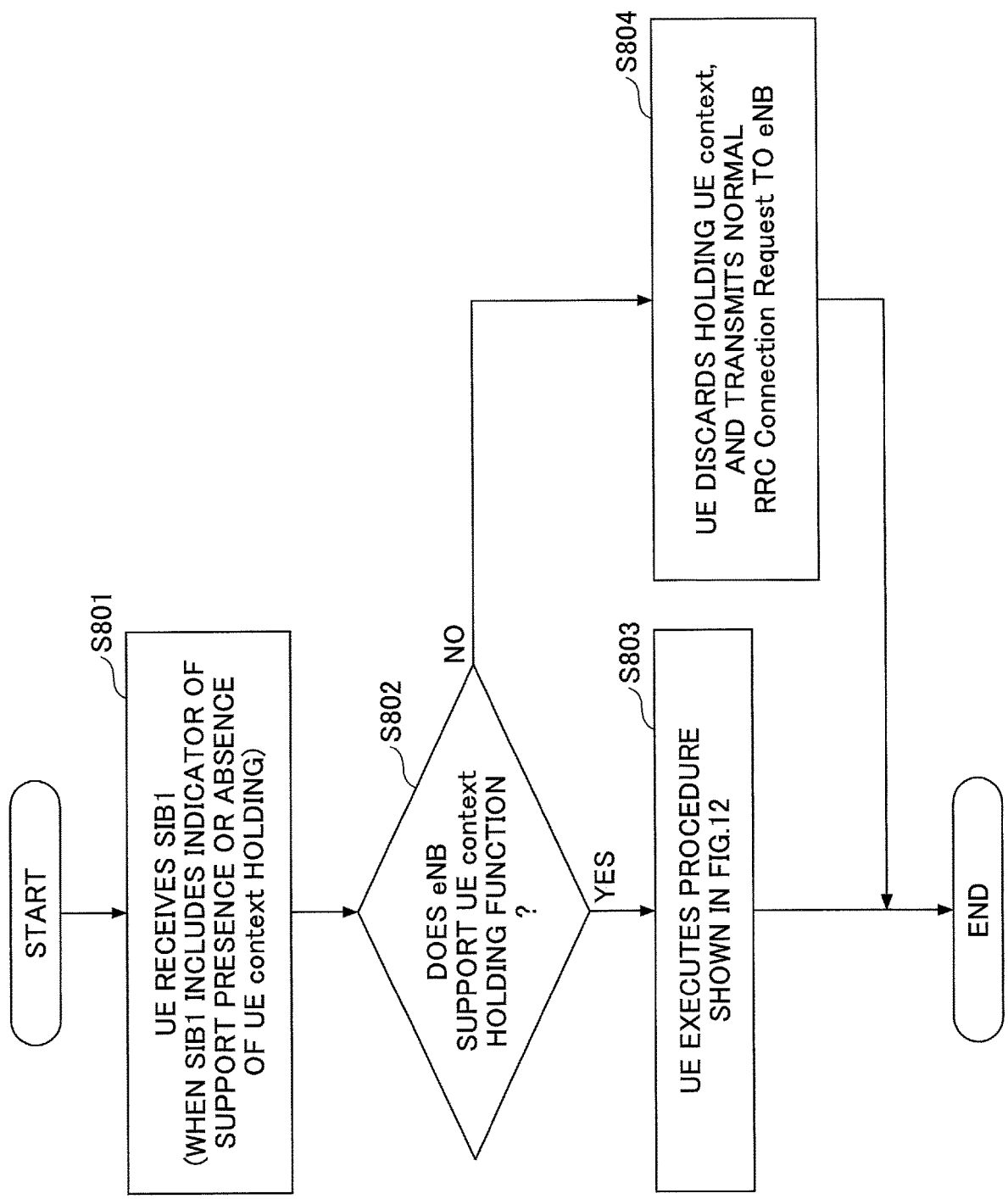
FIG. 20 is a flowchart for describing an exemplary operation of a UE according to the second embodiment.
Figure 21:
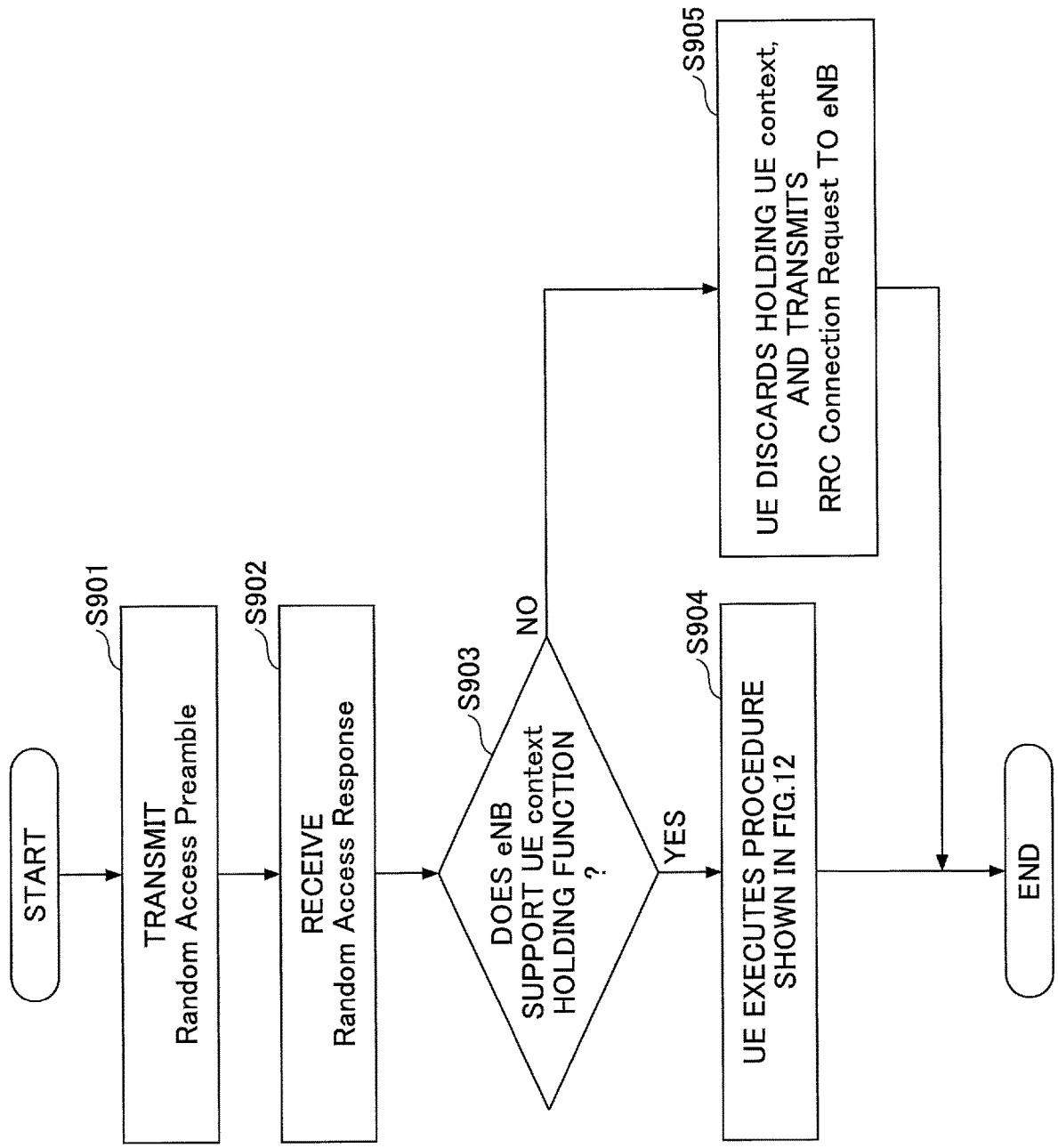
FIG. 21 is a flowchart for describing an exemplary operation of a UE according to the second embodiment.
Figure 22:
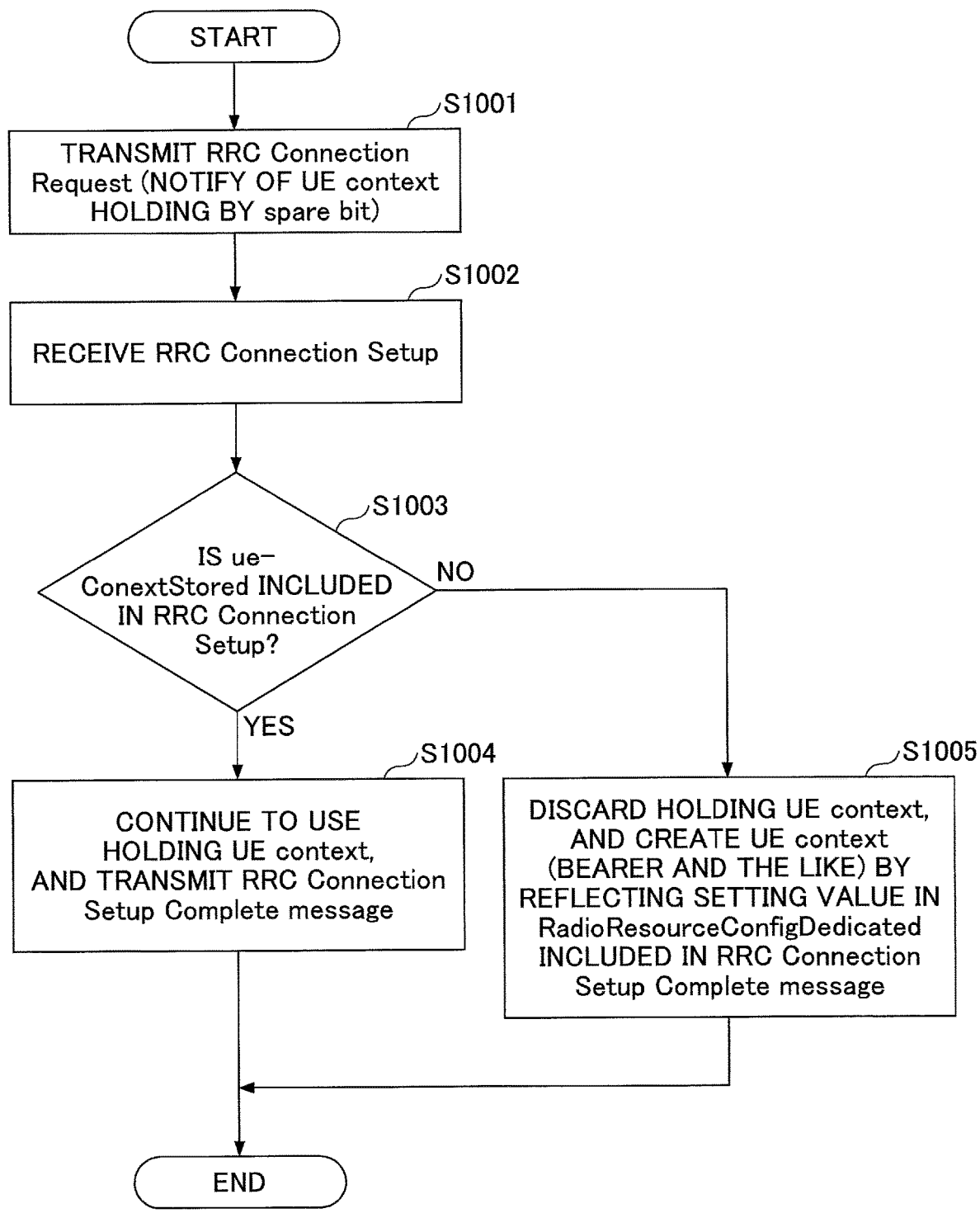
FIG. 22 is a flow chart for describing an exemplary operation of a UE according to the second embodiment.

For example, when "User plane CIoT EPS Optimisation" is used, the UE 50 performs the processes illustrated in FIGS. 7 and 8, or the processes illustrated in FIGS. 20 to 22. In the example operation 2 in which it is checked whether or not "upCIoTEPSOptimisationALLowed" is included, "upCIoTEPSOptimisationALLowed" is regarded as "instruction information indicating whether or not the base station has the context retention function" or not, and in step S24, S203 in FIG. 7, S304 in FIG. 8, the procedure illustrated in FIG. 12, or the like may be performed here.

When the determination result of step S23 is No, the process proceeds to step S25, and the UE 50 determines that access to the cell is prohibited (barred), for example, makes an attempt to access another cell. In the example operation 2, when the network does not support "C-plane solution" or "U-plane solution," the UE 50 is assumed not to be able to access the network. In other words, the UE 50 is assumed not to support NAS of a related art and support only NAS dedicated to the C/U-plane solution. Therefore, if the UE 50 supports the NAS scheme of the related art, access may be made in accordance with the NAS scheme of the related art in step S25.

When the determination result of step S22 is No, the process proceeds to step S26, and the UE 50 accesses the cell (eNB 10) using the scheme of "control planeCooteEPSoptimization," similarly to step S14 in the example operation 1.

<Specification Modification>

FIG. 27 illustrates a specification modification (excerpt) corresponding to the flow of FIG. 25. FIG. 27 illustrates changes from Non-Patent Document 4, and changed parts are underlined. As illustrated in FIG. 27, the content of the flow illustrated in FIG. 25 is added.

FIG. 28 illustrates a specification modification (excerpt) corresponding to the flow in FIG. 26. FIG. 28 illustrates changes from Non-Patent Document 4, and changed parts are underlined. As illustrated in FIG. 28, content of the flow illustrated in FIG. 26 is added.

As described above, by using the modification scheme, the UE 50 can flexibly select the scheme and perform access in accordance with a scheme supported by the network side.

<Other Examples in Modification>

In the present modification, the eNB gives a notification indicating whether the network supports "C-plane solution" and whether or not the network supports "U-plane solution" to the UE 50 through broadcast system information such as the SIB 2. The UE 50 that has received the notification transfers information (bits) of the notification to a higher layer (for example, the NAS layer). The UE 50 can perform an operation to be described below including the operation in the NAS layer on the basis of the information of the notification.

When the UE 50 that supports "U-plane solution" is in the idle state (or the suspended state) while retaining the context through the process illustrated in FIG. 5, FIG. 11, or FIG. 13, the UE 50 is assumed to start the procedure using an initial NAS message in a certain cell.

Examples of the initial NAS message include an ATTACH REQUEST, a DETACH REQUEST, a TRACKING AREA UPDATE REQUEST, a SERVICE REQUEST, an EXTENDED SERVICE REQUEST, and a CONTROL PLANE SERVICE REQUEST (Non-Patent Document 6).

When the UE 50 is an NB-S1 mode, that is, when the UE 50 is a UE for NB-IoT, the UE 50 requests the higher layer (for example, the RRC layer) to resume the RRC connection when the procedure of the NAS layer starts.

When UE 50 is a WB-S1 mode, that is, when the UE 50 is a non-NB-1OT UE, UE 50 performs the following operation. The WB-S1 mode is a mode when a non-NB-1OT UE (a UE which is not for NB-1OT) uses CIoT EPS optimization.

When the procedure of the NAS layer starts, the UE 50 first determines whether or not a notification indicating that the network supports "U-plane solution" has been received from the eNB through the broadcast system information. When the UE 50 has received the notification, the UE 50 requests the lower layer to resume the RRC connection. Then, for example, the UE 50 regards the notification as the "instruction information indicating whether or the base station has the context retention function," and performs S203 of FIG. 7, S304 of FIG. 8, or the procedure illustrated in FIG. 12.

When the UE 50 has not received the notification indicating that the UE 50 supports "U-plane solution" from the eNB through the broadcast system information, the UE 50 transmits the initial NAS message including the SERVICE REQUEST ad requests the lower layer to resume the RRC connection. In this case, in the lower layer that has received the request, the UE 50 drops, for example, the context and the Resume ID and transmits the RRC Connection Request.

Further, irrespective of whether the UE 50 is the NB-S1 mode or the WB-S1 mode, the UE 50 may perform the operation of the WBS 1 mode described above.

A specification modification corresponding to the above operation is illustrated in FIG. 29. In FIG. 29, for the excerpt from Non-Patent Document 6, changed parts corresponding to the above operation are underlined. In the specifications illustrated in FIG. 29, "Upon trigger of a procedure using an initial NAS message when in EMM-IDLE mode with suspend indication, the UE in NB-S1 mode shall request the lower layer to resume the RRC connection. In this request to the lower layer the NAS shall provide to the lower layer the RRC establishment cause and the call type according to annex D of this document;" and "Upon trigger of a procedure using an initial NAS message when in EMM-IDLE mode with suspend indication, if support of Use plane CIoT EPS optimization is received as part of the broadcast system information, the UE in WB-S1 mode shall request the lower layer to resume the RRC connection In this request to the lower layer the NAS shall provide to the lower layer the RRC establishment cause and the call type according to annex D of this document. If support of Use plane CIoT EPS optimization is not received as part of the broadcast system information, the UE in WB-S1 mode shall send an initial NAS message including SERVICE REQUEST and request the lower layer to initiate an RRC connection;" correspond to the above operation. Further, "in EMM-IDLE mode with suspend indication" indicates that the UE 50 is in the idle state while retaining the context.

In this example, when the information indicating that the network supports the "C-plane solution" is not received from the eNB through the broadcast system information, the UE 50 of the WB-S1 mode does not request the eNB side to use "C-plane solution" through the ATTACH REQUEST. A specification modification corresponding to this operation is illustrated in FIG. 30. In FIG. 30, for the excerpt from Non-Patent Document 6, changed parts corresponding to the above operation are underlined. In the specification illustrated in FIG. 30, "In WB-S1 mode, if the PLMN support of control plane CIoT EPS optimization is not received as part of the broadcast system information, then the UE shall not request" control plane CIoT EPS optimization "in the Additional update type IE of the ATTACH REQUEST message." corresponds to the above operation.

In this example, when the information indicating that the network supports the "C-plane solution" is not received from the eNB through the broadcast system information, the UE 50 of the WB-S1 mode does not request the eNB side to use the "C-plane solution" through the TRACKING AREA UPDATE REQUEST. A specification modification corresponding to this operation is illustrated in FIG. 31. In FIG. 31, for the excerpt from Non-Patent Document 6, changed parts corresponding to the above operations are underlined. In the specification illustrated in FIG. 31, "In WB-S1 mode, if the PLMN support of control plane CIoT EPS optimization is not received as part of the broadcast system information, then the UE shall not request" control plane CIoT EPS optimization "in the Additional update type IE of the TRACKING AREA UPDATE REQUEST message." corresponds to the above operation.

Further, in the case in which the UE 50 is a non-NB-IoT UE, the UE 50 moves to a cell in which the "C-plane solution" is used, and the SERVICE REQUEST is activated in the cell, the UE 50 perform the following operation.

When the information indicating that the network supports the "C-plane solution" is received from the eNB through the broadcast system information, the UE 50 transmits a dedicated CONTROL PLANE SERVICE REQUEST and enters a state of EMM-SERVICE-REQUEST-INITIATED. Further, when the information indicating that the network supports the "C-plane solution" is not received from the eNB through the broadcast system information, the UE 50 transmits the SERVICE REQUEST or the EXTEND SERVICE REQUEST ad enters the state of EMM-SERVICE-REQUEST-INITIATED.

A specification modification corresponding to the above operation is illustrated in FIG. 32

Figure 33:
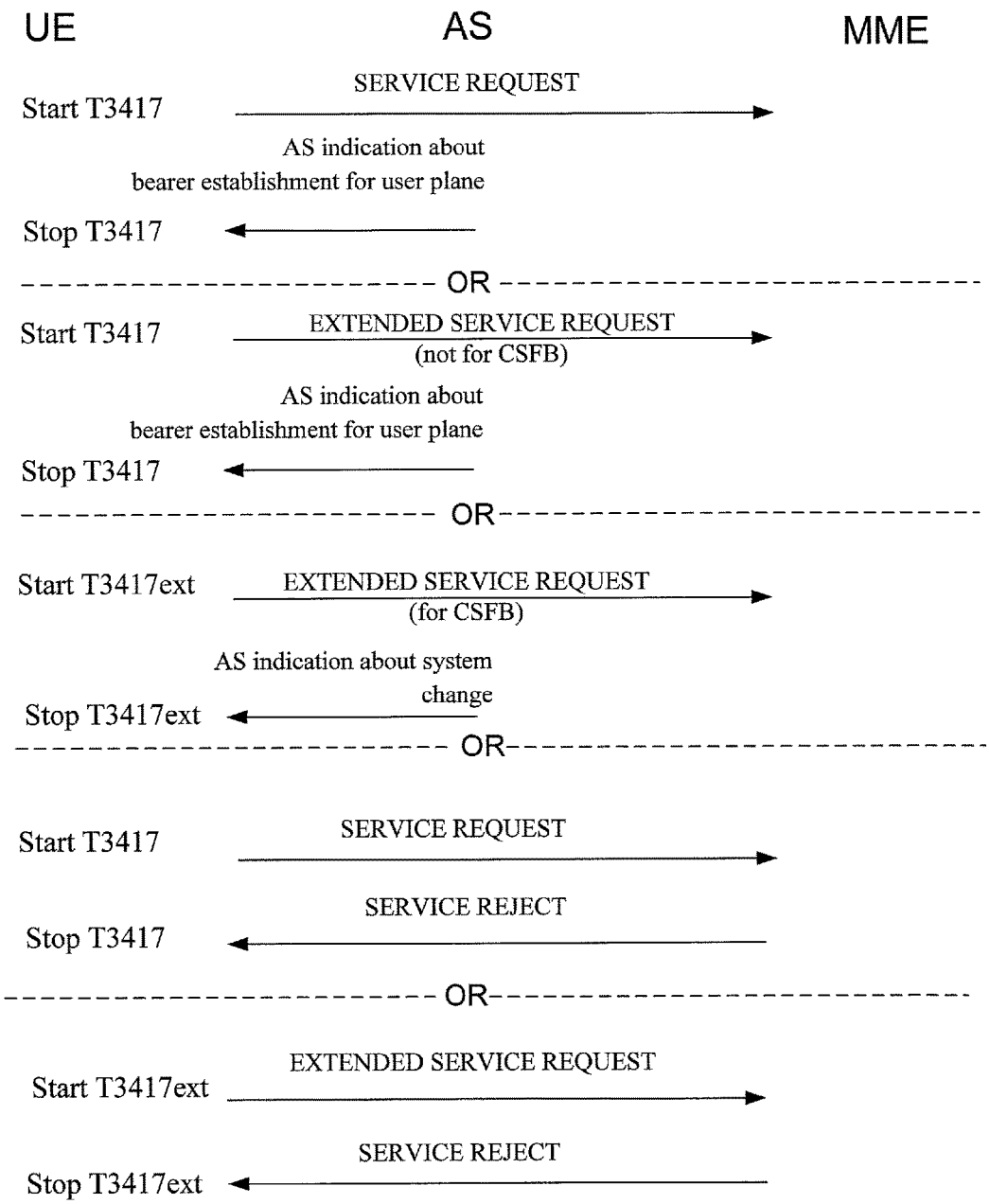
FIG. 33 is a diagram for describing a specification modification of 3GPP TS 24.301.

In FIG. 32, for the excerpt from Non-Patent Document 6, changed parts corresponding to the above operation are underlined. In the specification illustrated in FIG. 32, "In WB-S1 mode, if the PLMN support of control plane CIoT EPS optimization is received as part of the broadcast system information, the UE sends a CONTROL PLANE SERVICE REQUEST message, start T3417 and enter the state EMM-SERVICE-REQUEST-INITIATED. Otherwise, the UE sends a SERVICE REQUEST or EXTENDED SERVICE REQUEST message, start T3417 or T3417ext and enter the state EMM-SERVICE-REQUEST-INITIATED." corresponds to the above operation. When the information indicating that the network supports the "C-plane solution" is not received from the eNB through the broadcast system information, the UE 50 performs any one of a plurality of procedures illustrated in FIG. 33.

(Exemplary Device Configuration)

Next, an exemplary configuration of each of the devices according to an embodiment of the present invention will be described. In a configuration of each of the respective devices to be described below, only functional units particularly related to the embodiment of the invention are illustrated, and functions (not illustrated) for operating as a device in a communication system conforming to at least LTE (LTE of a meaning including an EPC) are also provided. Further, functional configurations illustrated in the respective drawing are merely examples. Any classification or any name may be used as a function classification or a name of a functional unit as long as the operation according to the preset embodiment can be performed.

Each device may have the function of both of the first embodiment and the second embodiment may have any one of the first embodiment and the second embodiment. Further, each device may have all the functions of the first embodiment, the second embodiment, and the modifications or may have any one of the "first embodiment and the modification" and the "second embodiment and the modification." In the following description, each device is assumed to have at least the functions of both of the first embodiment and the second embodiment.

<Exemplary Configurations of MME and S-GW>

Figure 34:
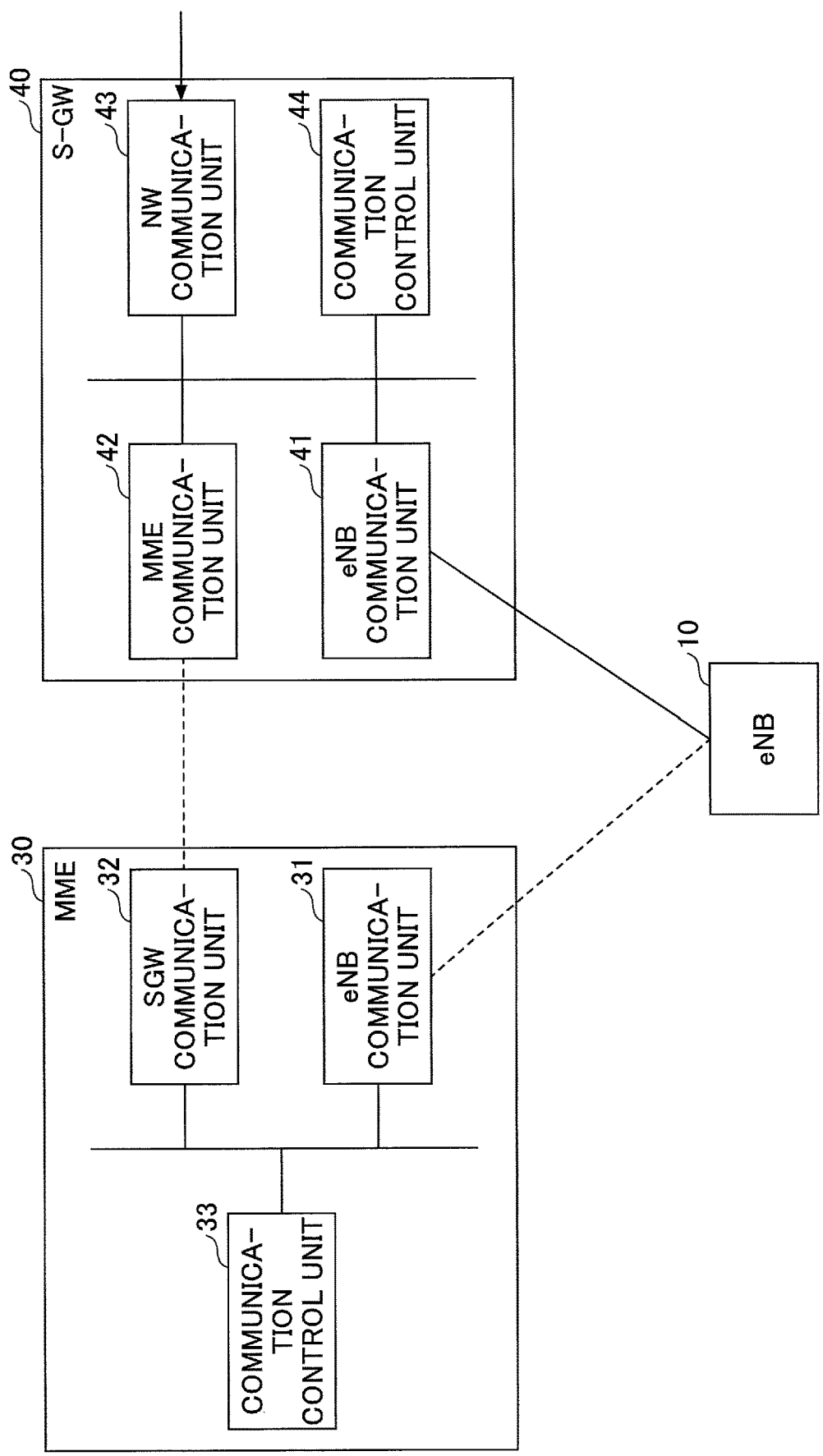
FIG. 34 is a configuration diagram of an MME and an S-GW.

First, exemplary configurations of the MME 30 and the S-GW 40 will be described with reference to FIG. 34. As illustrated in FIG. 34, the MME 30 includes an eNB communication unit 31, an SGW communication unit 32, and a communication control unit 33.

The eNB communication unit 31 has a function of transmitting or receiving control signals to or from the eNB through an S1 MME interface. The SGW communication unit 32 includes a function of transmitting or receiving a control signals to or from the S-GW through an S11 interface.

The S-GW 40 includes an eNB communication unit 41, an MME communication unit 42, an NW communication unit 43, and a communication control unit 44. The eNB communication unit 41 has a function of transmitting or receiving control signals to or from the eNB through an S1-U interface. The MME communication unit 42 41 a function of transmitting or receiving control signals to or from the MME through an S11 interface. The NW communication unit 43 has a function for performing transmission and reception of control signals and transmission and reception of data with a node device on a core NW side.

The above description is common to the first embodiment and the second embodiment. Particularly, the function of the second embodiment (the scheme different from that of Non-Patent Document 3) will be described below.

When the connection retention instruction signal is received from the eNB, the communication control unit 33 instructs the SGW communication unit 32 to transmit the connection retention instruction signal to the S-GW, and when the acknowledge response is received from the S-GW, the communication control unit 33 instructs the SGW communication unit 32 to transmit the acknowledge response to the eNB.

The communication control unit 44 has a function of instructing the MME communication unit 42 to transmit an acknowledge response to the MME when the connection retention instruction signal is received from the MME. Further, in the case in which the connection retention instruction signal is received from the MME, the communication control unit 44 has a function of instructing the NW communication unit 43 to retain the downlink data in the buffer when downlink data to the corresponding UE is received and instructing the NW communication unit 43 to transmit the downlink data to transmit the downlink data when the RRC connection establishment complete is received from the eNB.

The MME 30 and the S-GW 40 can be configured as a single device. In this case, communication of the S11 interface communication between the SGW communication unit 32 and the MME communication unit 42 is communication inside the device.

Next, exemplary configurations of the UE 50 and the eNB 10 according to the embodiment of the present invention (including the first embodiment, the second embodiment, and the modification) will be described.

<User Equipment UE>

Figure 35:
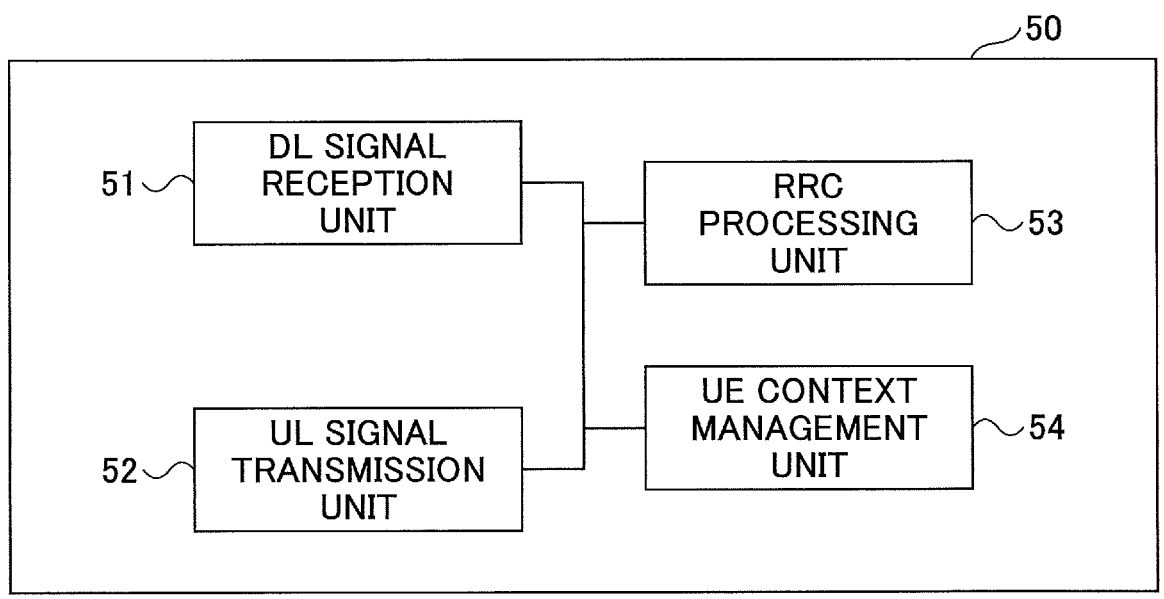
FIG. 35 is a configuration diagram of a UE 50.

FIG. 35 illustrates a functional configuration diagram of the user equipment (UE 50). As illustrated in FIG. 35, the UE 50 includes a DL signal receiving unit 51, an UL signal transmitting unit 52, an RRC processing unit 53, and a UE context management unit 54. FIG. 46 illustrates only functional units of the UE 50 particularly related to the present invention, and the UE 50 also has functions (not illustrated) of performing at least operations conforming to LTE.

The DL signal receiving unit 51 has a function of receiving various kinds of downlink signals from the base station eNB and acquiring information of a higher layer from received signals of the physical layer, and the UL signal transmitting unit 52 has a function of generating various kinds of signals of the physical layer from information of the higher layer to be transmitted from the UE 50 and transmitting the generated signals to the base station eNB.

The RRC processing unit 53 performs the UE side determination process, the generation, the transmission, and the reception of the RRC message (the transmission is transmission via the UL signal transmitting unit 52), interpretation of the broadcast information and the RRC message received by the DL signal receiving unit 51, the generation, the transmission, and the reception of the NAS message (the transmission is transmission via the UL signal transmitting unit 52, and the reception is reception via the DL signal receiving unit 51), the request from the NAS layer to the lower layer, the notification of the U/C plane support information to the higher layer, and the like which have been described above with reference to FIGS. 7 to 10, 12, 13, 15 to 22, 25, 26, and 29 to 33. Further, the transmission and reception of the MAC signal in the random access procedure described with reference to FIGS. 8 to 10 and FIG. 21 may be performed by the DL signal receiving unit 51 and the UL signal transmitting unit 52. Further, the RRC processing unit 53 has a function of resuming the RRC connection using the UE context retained in the UE context management unit 54. Further, the RRC processing unit 53 has a function of dropping the retained UE context and starting the RRC connection through the RRC connection request when the RRC connection is not resumed (for example, the eNB does not support the retention function or when the information indicating that the U-plane solution is supported is not received from the eNB). Further, the RRC processing unit 53 has a function of resuming the RRC connection using the UE context retained in the UE context management unit 54. In the present embodiment, since the RRC processing unit 53 also performs the process of the NAS layer, the RRC processing unit 53 may be referred to as an "RRC/NAS processing unit 53."

The UE context management unit 54 includes a storage unit such as a memory and retains, for example, the UE context and the UE identifier (S-TMSI or the like) in the RRC retention state/RRC idle state on the basis of the instruction described in step 107 of FIG. 5, FIG. 13, and the like. In the procedure illustrated in FIG. 12, the UE context management unit 54 determines whether or not the UE context is retained, and instructs the RRC processing unit 53 to give the notification of the information indicating that the UE context is retained when the UE context is retained.

The entire configuration of the UE 50 illustrated in FIG. 35 may be implemented by a hardware circuit (for example, one or more IC chips), or a part of the configuration of the UE 50 may be implemented by a hardware circuit, and the remaining parts may be implemented by a CPU and a program.

Figure 36:
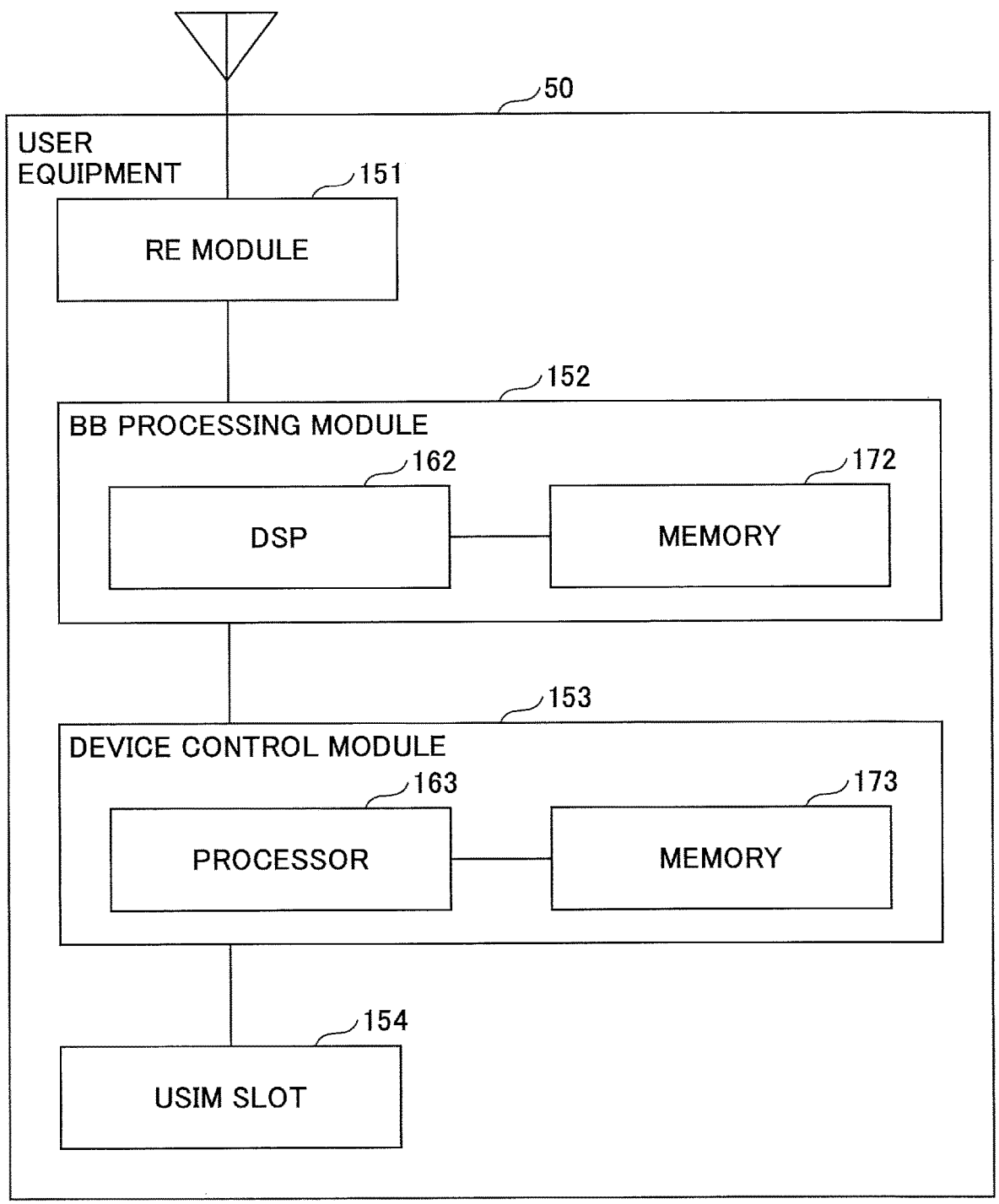
FIG. 36 is a HW configuration diagram of the UE 50.

FIG. 36 is a diagram illustrating an example of a hardware (HW) configuration of the UE 50. FIG. 36 illustrates a configuration which is closer to an implementation example than that of FIG. 35. As illustrated in FIG. 36, the UE includes a radio equipment (RE) module 151 that performs processing related to a radio signal, a baseband (BB) processing module 152 that performs baseband signal processing, a device control module 153 that performs processing of a higher layer or the like, and a USIM slot 154 which is an interface for accessing a USIM card.

The RE module 151 performs digital-to-analog (D/A) conversion, modulation, frequency transform, power amplification, and the like on a digital baseband signal received from the BB processing module 152, and generates a radio signal to be transmitted from an antenna. Further, the RE module 151 performs frequency transform, analog to digital (A/D) conversion, demodulation, and the like on a received radio signal, generates a digital baseband signal, and transfers the digital baseband signal to the BB processing module 152. The RE module 151 includes, for example, the functions of the physical layer of the UL signal transmitting unit 52 and the DL signal receiving unit 51 in FIG. 35.

The BB processing module 152 performs a process of converting an IP packet into a digital baseband signal and vice versa. A digital signal processor (DSP) 162 is a processor that performs signal processing in the BB processing module 152. A memory 172 is used as a work area of the DSP 162. The BB processing module 152 has, for example, functions of the layer 2 and the like in the DL signal receiving unit 51 and the UL signal transmitting unit 52 of FIG. 35, the RRC processing unit 53, and the UE context management unit 54. All or some of the RRC processing unit 53 and the UE context management unit 54 may be included in the device control module 153.

The device control module 153 performs protocol processing of the IP layer, various kinds of application processing, and the like. A processor 163 is a processor that performs processing performed by the device control module 203. A memory 173 is used as a work area of the processor 163. Further, the processor 163 reads or writes data from or in the USIM via the USIM slot 154.

<Base Station eNB>

Figure 37:
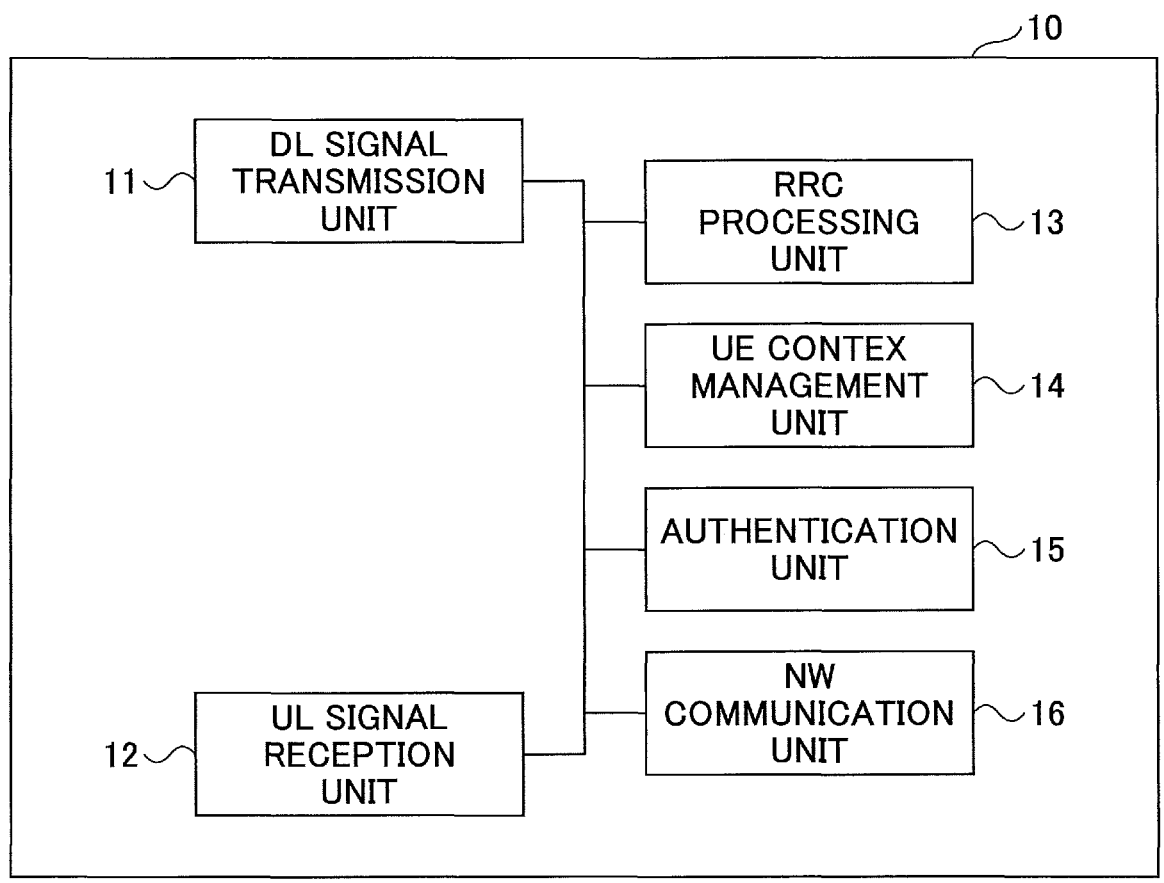
FIG. 37 is a configuration diagram of an eNB 10.

FIG. 37 illustrates a functional configuration diagram of the base station eNB (eNB 10). As illustrated in FIG. 37, the eNB 10 includes a DL signal transmitting unit 11, a UL signal receiving unit 12, an RRC processing unit 13, a UE context management unit 14, an authenticating unit 15, and an NW communication unit 16. FIG. 37 illustrates only functional units of the eNB particularly related to the embodiment of the present invention, and the eNB 10 also has functions (not illustrated) of performing at least operations conforming to the LTE scheme.

The DL signal transmitting unit 11 has a function of generating various kinds of signals of the physical layer from signals of a higher layer to be transmitted from the eNB 10 and transmitting the signals. The UL signal receiving unit 12 has a function of receiving various kinds of uplink signals from the user equipment UE and acquiring information of the higher layer from the received signal of the physical layer.

The RRC processing unit 13 performs the eNB side determination process, the generation and transmission of the RRC message and the broadcast information (the transmission is transmission via the DL signal transmitting unit 11), and interpretation of the RRC message received by the UL signal receiving unit 12, and the like which have been described above with reference to FIGS. 7 to 10, 12, 13, and 15 to 22. Further, the transmission and reception of the MAC signal in the random access procedure described with reference to FIGS. 8 to 10 and FIG. 21 may be performed through the DL signal transmitting unit 11 and the UL signal receiving unit 12. The RRC processing unit 13 has a function of resuming the RRC connection using the UE context retained in the UE context management unit 14.

The UE context management unit 14 includes a storage unit such as a memory and, for example, retains the UE context and the UE identifier (the S-TMSI or the like) in the RRC retention state/RRC idle state on the basis of the instruction described in step 107 of FIG. 5, FIG. 13, and the like. Further, in the procedure illustrated in FIG. 12, the UE context management unit 14 searches for the UE context on the basis of the UE identifier received from the UE, and when the UE context is checked to be retained, the UE context management unit 14 gives the notification indicating that the UE context is retained and the authentication information request to the RRC processing unit 13.

The authenticating unit 15 has a function of receiving the authentication information from the UE and authenticating the UE in step S03 illustrated in FIG. 12.

The NW communication unit 16 has a function of transmitting or receiving control signals to or from the MME through the S1-MME interface, a function of transmitting or receiving data to or from the S-GW through the S1-U interface, a function of transmitting the connection retention instruction signal, a function of transmitting the RRC connection establishment complete, and the like.

The entire configuration of the eNB 10 illustrated in FIG. 37 may be implemented by a hardware circuit (for example, one or more IC chips), or a part of the configuration of the UE 50 may be implemented by a hardware circuit, and the remaining parts may be implemented by a CPU and a program.

Figure 38:
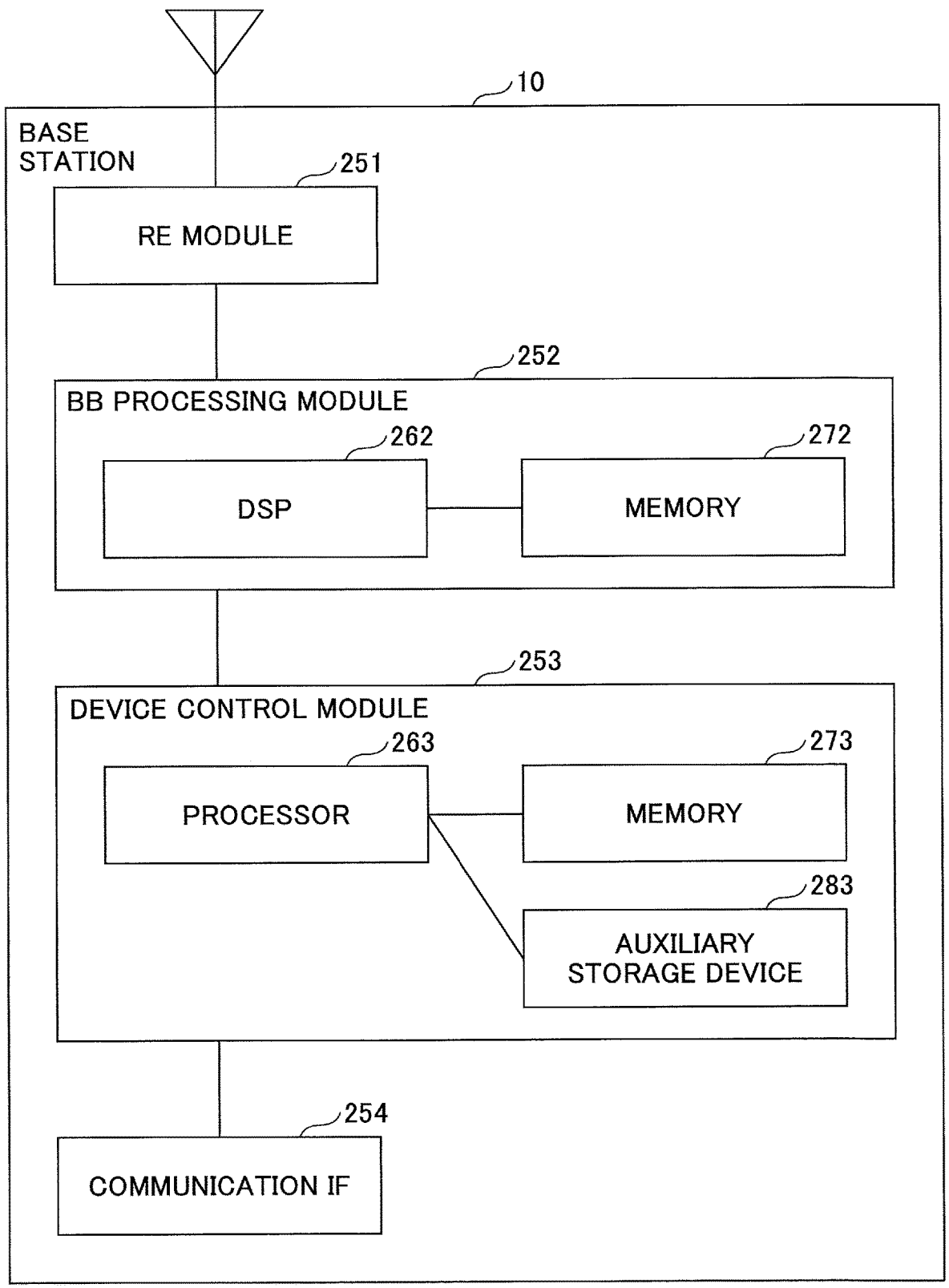
FIG. 38 is a HW configuration diagram of the eNB 10.

FIG. 38 is a diagram illustrating an example of the hardware (HW) configuration of the eNB 10. FIG. 38 illustrates a configuration which is closer to an implementation example than that of FIG. 37. As illustrated in FIG. 38, the base station eNB includes an RE module 251 that performs processing related to a radio signal, a BB processing module 252 that performs baseband signal processing, a device control module 253 that performs processing of a higher layer or the like, and a communication IF 254 which is an interface of a connection with a network.

The RE module 251 performs D/A conversion, modulation, frequency transform, power amplification, and the like on a digital baseband signal received from the BB processing module 252, and generates a radio signal to be transmitted from an antenna. Further, the RE module 251 performs frequency transform, analog to digital (A/D) conversion, demodulation, and the like on a received radio signal, generates a digital baseband signal, and transfers the digital baseband signal to the BB processing module 252. The RE module 251 has, for example, the functions of the physical layer in the DL signal transmitting unit 11 and the UL signal receiving unit 12 of FIG. 37.

The BB processing module 252 performs a process of converting an IP packet into a digital baseband signal and vice versa. A DSP 262 is a processor that performs signal processing in the BB processing module 252. A memory 272 is used as a work area of the DSP 252. The BB processing module 252 includes, for example, functions of the layer 2 in the DL signal transmitting unit 11 and the UL signal receiving unit 12, the RRC processing unit 13, the UE context management unit 14, and the authenticating unit 15, in FIG. 37. All or some of the functions of the RRC processing unit 13, the UE context management unit 14, and the authenticating unit 15 may be included in the device control module 253.

The device control module 253 performs protocol processing of the IP layer, OAM processing, and the like. A processor 263 is a processor that performs processing performed by the device control module 253. A memory 273 is used as a work area of the processor 263. An auxiliary storage device 283 is, for example, an HDD or the like, and stores various kinds of configuration information and the like for the operation of the base station eNB.

The configuration (function classification) of each of the devices illustrated in FIGS. 34 to 38 are merely an example of a configuration for implementing the process described in the present embodiment (including the first and second modifications). An implementation method thereof (a specific arrangement of functional units, names thereof, and the like) is not limited to a specific implementation method as long as the process described in the present embodiment (including the first and second modifications) can be implemented.

Conclusion of Embodiment

As described above, according to the present embodiment, provided is a user equipment in a mobile communication system that supports a function of performing connection establishment reusing context information retained in each of the user equipment and a base station, including: a receiving unit that receives instruction information indicating whether or not the base station has a context retention function from the base station; a determining unit that determines whether or not the base station has the context retention function on the basis of the instruction information received through the receiving unit; and a transmitting unit that transmits a message including context retention information indicating that the user equipment retains user equipment side context information to the base station when the determining unit determines that the base station has the context retention function.

Through the above configuration, in the mobile communication system that supports a function of performing connection establishment reusing the context information retained in each of a user equipment and a base station, the user equipment can determine whether or not the base station has a function of reusing the context information.

For example, the receiving unit receives the instruction information included in broadcast information or a Random Access Response.

Through this configuration, the user equipment can receive the instruction signal without introducing a new signal.

For example, the transmitting unit uses a resume ID in a scheme having a connection retention state as a state in which the context information is retained as the context retention information, and transmits a connection resume request message including the resume ID to the base station as the message.

According to this configuration, for example, in the scheme described in the Non-Patent Document 3, the user equipment can determine whether or not base station retrains the function of reusing the context information.

The transmitting unit may transmit a connection request message including the context retention information to the base station.

Through this configuration, it is possible to transmit the connection request message the base station which is confirmed to retrain the function of reusing the context information, and it is possible to reliably perform the connection establishment reusing the context information.

Further, according to the present embodiment, provided is a user equipment in a mobile communication system that supports a function of performing connection establishment reusing context information retained in each of the user equipment and a base station, including: a transmitting unit that transmits a connection request message including first context retention information indicating that the user equipment retains user equipment side context information to the base station; a determination unit that determines whether or not second context retention information indicating that the base station retains base station side context information associated with the user equipment is included in a connection setup message received from the base station; and a connecting unit that establishes a connection with the base station using the user equipment side context information when the determining unit determines that the second context retention information is included in the connection setup message.

Through the above configuration, in the mobile communication system that supports a function of performing connection establishment reusing the context information retained in each of a user equipment and a base station, the user equipment can determine whether or not the base station has a function of reusing the context information.

Further, according to the present embodiment, provided is a base station in a mobile communication system that supports a function of performing connection establishment reusing context information retained in each of a user equipment and the base station, including: a transmitting unit that transmits instruction information indicating whether or not the base station has a context retention function to the user equipment; and a receiving unit that receives a message including context retention information indicating that the user equipment retains user equipment side context information when the user equipment determines that the base station has the context retention function on the basis of the instruction information from the user equipment.

Through the above configuration, in the mobile communication system that supports a function of performing connection establishment reusing the context information retained in each of a user equipment and a base station, the user equipment can determine whether or not the base station has a function of reusing the context information.

For example, the transmitting unit transmits the broadcast information or the Random Access Response including the instruction information to the user equipment.

Through this configuration, the user equipment can receive the instruction signal without introducing a new signal.

The receiving unit may receive a connection request message including the context retention information from the user equipment.

Through this configuration, the base station which is confirmed to retrain the function of reusing the context information can receive the connection request message and can reliably perform the connection establishment reusing the context information.

As described above, according to the present embodiment, provided is a user equipment in a mobile communication system that supports a function of performing connection establishment reusing context information retained in each of the user equipment and a base station, including: a transmitting unit that transmits a connection request message including first context retention information indicating that the user equipment retains user equipment side context information to the base station; a receiving unit that receives a connection setup message including second context retention information indicating that the base station retains base station side context information associated with the user equipment from the base station; and a connecting unit that establishes a connection with the base station using the user equipment side context information after receiving the connection setup message.

Through the above configuration, in the mobile communication system that supports the function of performing connection establishment reusing context information retained in each of the user equipment and the base station, the base station can determine whether or not the user equipment retains the context information.

The connection setup message may include a transmission request of authentication information for the user equipment in addition to the second context retention information, and the transmitting unit may transmit the authentication information to the base station on the basis of the transmission request. Through this configuration the base station can establish the connection after authenticating the user equipment.

For example, the transmitting unit transmits a connection setup complete message including the authentication information to the base station. Through this configuration, it is unnecessary to transmit the authentication information through a special message, and the message can be reduced.

The receiving unit may receive a connection release message for causing the user equipment to transition from a connected state to an idle state from the base station and retain the user equipment side context information in a storage unit in the idle state when information for giving an instruction to retain the user equipment side context information is detected from the connection release message. Through this configuration, when the instruction is not received, the user equipment may not retain the user equipment side context information, and it is possible to prevent the user equipment side context information from being retained in vain.

Further, according to the present embodiment, provided is a base station in a mobile communication system that supports a function of performing connection establishment reusing context information retained in each of a user equipment and the base station, including: a receiving unit that receives a connection request message including first context retention information indicating that the user equipment retains user equipment side context information from the user equipment; a transmitting unit that transmits a connection setup message including second context retention information indicating that the base station retains base station side context information associated with the user equipment in accordance with reception of the first message; and a connecting unit that establishes a connection with the user equipment using the base station side context information after the connection setup message is transmitted.

Through the above configuration, in the mobile communication system that supports the function of performing connection establishment reusing context information retained in each of the user equipment and the base station, the base station can determine whether or not the user equipment retains the context information.

For example, the receiving unit acquires an identifier of the user equipment from the connection request message and searches for the base station side context information corresponding to the identifier from a plurality of pieces of retained base station side context information. As described above, it is possible to reliably detect the base station side context information associated with the user equipment using the identifier.

The connection setup message may include a transmission request of authentication information for the user equipment in addition to the second context retention information, and an authenticating unit that authenticates the user equipment using the authentication information transmitted from the user equipment on the basis of the transmission request may be further provided. Through this configuration, the base station can establish the connection after authenticating the user equipment.

The transmitting unit may include information for giving an instruction to retain the user equipment side context information in the connection release message for causing the user equipment to transition from a connected state to an idle state and transmit the connection release message to the user equipment. Through this configuration, when the instruction is not received, the user equipment may not retain the user equipment side context information, and it is possible to prevent the user equipment side context information from being retained in vain.

Further, "means" in the configuration of each of the above devices may be replaced with "unit", "circuit", "device", or the like.

The exemplary embodiment of the present invention has been described above, but the disclosed invention is not limited to the above embodiment, and those skilled in the art would understand that various modified examples, revised examples, alternative examples, substitution examples, and the like can be made. In order to facilitate understanding of the invention, specific numerical value examples have been used for description, but the numerical values are merely examples, and certain suitable values may be used unless otherwise stated. A classification of items in the above description is not essential to the present invention, matters described in two or more items may be combined and used as necessary, and a matter described in one item may be applied to a matter described in another item (unless inconsistent). The boundary between functional units or processing units in a functional block diagram does not necessarily correspond to the boundary between physical parts. Operations of a plurality of functional units may be performed physically by one component, or an operation of one functional unit may be performed physically by a plurality of parts. For the sake of convenience of description, each device has been described using the functional block diagrams, but each device may be implemented by hardware, software, or a combination thereof. Software executed by the processor included in the user equipment UE according to the embodiment of the present invention and software executed by the processor included in the base station eNB according to the embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

The configurations illustrated in the present specification are exemplarily listed below.

(1)

A user equipment in a mobile communication system that supports a function of performing connection establishment reusing context information retained in each of the user equipment and a base station, including:

a receiving unit that receives instruction information indicating whether or not the base station has a context retention function from the base station;

a determining unit that determines whether or not the base station has the context retention function on the basis of the instruction information received through the receiving unit; and a transmitting unit that transmits a message including context retention information indicating that the user equipment retains user equipment side context information to the base station when the determining unit determines that the base station has the context retention function.

(2)

The user equipment according to (1), wherein the receiving unit receives the instruction information included in broadcast information or a Random Access Response.

(3)

The user equipment according to (1) or (2), wherein the transmitting unit uses a resume ID in a scheme having a connection retention state as a state in which the context information is retained as the context retention information, and transmits a connection resume request message including the resume ID to the base station as the message.

(4)

The user equipment according to (1) or (2), wherein the transmitting unit may transmit a connection request message including the context retention information to the base station.

(5)

A user equipment in a mobile communication system that supports a function of performing connection establishment reusing context information retained in each of the user equipment and a base station, including:

a transmitting unit that transmits a connection request message including first context retention information indicating that the user equipment retains user equipment side context information to the base station;

a determination unit that determines whether or not second context retention information indicating that the base station retains base station side context information associated with the user equipment is included in a connection setup message received from the base station; and a connecting unit that establishes a connection with the base station using the user equipment side context information when the determining unit determines that the second context retention information is included in the connection setup message.

(6)

A base station in a mobile communication system that supports a function of performing connection establishment reusing context information retained in each of a user equipment and the base station, including:

a transmitting unit that transmits instruction information indicating whether or not the base station has a context retention function to the user equipment; and a receiving unit that receives a message including context retention information indicating that the user equipment retains user equipment side context information when the user equipment determines that the base station has the context retention function on the basis of the instruction information from the user equipment.

(7)

The base station according to (6), wherein the transmitting unit transmits broadcast information or Random Access Response including the instruction information to the user equipment.

(8)

The base station according to (6) or (7), wherein the receiving unit receives a connection request message including the context retention information from the user equipment.

(9)

A connection establishment method performed by a user equipment in a mobile communication system that supports a function of performing connection establishment reusing context information retained in each of the user equipment and a base station, the connection establishment method including:

a reception step of receiving instruction information indicating whether or not the base station has a context retention function from the base station;

a determination step of determining whether or not the base station has the context retention function on the basis of the instruction information received in the reception step; and a transmission step of transmitting a message including context retention information indicating that the user equipment retains user equipment side context information to the base station when the base station is determined to have the context retention function in the determination step.

(10)

A connection establishment method performed by a base station in a mobile communication system that supports a function of performing connection establishment reusing context information retained in each of a user equipment and the base station, the connection establishment method including:

a transmission step of transmitting instruction information indicating whether or not the base station has a context retention function to the user equipment; and a reception step of receiving a message including context retention information indicating that the user equipment retains user equipment side context information when the user equipment determines that the base station has the context retention function on the basis of the instruction information from the user equipment.

Supplement of Embodiment

A notification of information is not limited to the aspect or embodiment described in this specification and may be given by any other method. For example, the notification of information may be given by physical layer signaling (for example, downlink control information (DCI) or uplink control information (UCI)), higher layer signaling (for example, RRC signaling, MAC signaling, broadcast information (master information block (MIB), system information block (SIB))), other signals, or a combination thereof. Further, the RRC message may be referred to as "RRC signaling." Further, the RRC message may be, for example, an RRC connection setup message, an RRC connection reconfiguration message, or the like.

Each aspect and embodiment of the present invention may be applied to LTE, LTE-A, SUPER 3G, IMT-advanced, 4G, 5G, Future Radio Access (FRA), W-CDMA (registered trademark), GSM (registered trademark), CDMA 2000, Ultra Mobile Broadband (UMB), IEEE 802.11 (Wi-Fi), IEEE 802.16 (WiMAX), IEEE 802.20, Ultra-WideBand (UWB), Bluetooth (registered trademark), a system using any other appropriate system, and/or next generation systems extended on the basis of these standards.

The determination may be performed in accordance with a value (0 or 1) indicated by one bit, may be performed in accordance with a Boolean value (true or false), or may be performed by a comparison of numerical values (for example, a comparison with a predetermined value).

The terms described in this specification and/or terms necessary for understanding this specification may be replaced with terms having the same or similar meanings. For example, a channel and/or a symbol may be a signal. Further, a signal may be a message.

The mobile station UE may be a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, it may also be referred to as a remote terminal, handset, user agent, mobile client, client, or some other suitable term.

Each aspect/embodiment described in this specification may be used alone, in combination, or may be switched in accordance with the execution. Further, notification of predetermined information (for example, notification of "being X") is not limited to being performed explicitly, but is performed by implicit (for example, not notifying the predetermined information) It is also good.

The terms "determining" and "deciding" used in this specification may include a wide variety of actions. For example, "determining" and "deciding" may include, for example, events in which events such as calculating, calculating, computing, processing, deriving, investigating, looking up (for example, looking up in a table, a database, or another data structure), or ascertaining are regarded as "determining" or "deciding." Further, "determining" and "deciding" may include, for example, events in which events such as receiving (for example, receiving information), transmitting (for example, transmitting information), input, output, or accessing (for example, accessing data in a memory) are regarded as "determining" or "deciding." Further, "determining" and "deciding" may include, for example, events in which events such as resolving, selecting, choosing, establishing, or comparing are regarded as "determining" or "deciding." In other words, "determining" and "deciding" may include events in which a certain operation is regarded as "determining" or "deciding."

A phrase "on the basis of" used in this specification is not limited to "on the basis of only" unless otherwise stated. In other words, a phrase "on the basis of" means both "on the basis of only" and "on the basis of at least."

The processing procedures, the sequences, and the like of the respective aspects/embodiments described in this specification may be reversed in order unless there is a contradiction. For example, the method described in this specification presents elements of various steps in an exemplary order and is not limited to a presented specific order.

Input and output information and the like may be stored in a specific place (for example, a memory) or may be managed through a management table. Input and output information and the like may be overwritten, updated, or additionally written. Output information and the like may be deleted. Input information and the like may be transmitted to another device.

Information, signals, and the like described in this specification may be indicated using any one of a variety of different techniques. For example, data, instructions, commands, information, signals, bits, symbols, chips, and the like which are mentioned throughout the above description may be indicated by voltages, currents, electromagnetic waves, magnetic particles, optical fields or photons, or an arbitrary combination thereof.

Further, information, parameters, and the like described in this specification may be indicated by absolute values, may be indicated by relative values from predetermined values, or may be indicated by corresponding other information.

The present invention is not limited to the above embodiments, and various modified examples, revised examples, alternative examples, substitution examples, and the like are included in the present invention without departing from the spirit of the present invention.

This application claims the benefit of Japanese Priority Patent Application JP 2015-218015 filed Nov. 5, 2015, Japanese Priority Patent Application JP 2016-96521 filed May 12, 2016, and Japanese Priority Patent Application JP 2016-139715 filed Jul. 14, 2016, the entire contents of each of which are incorporated herein by reference.

EXPLANATIONS OF LETTERS OR NUMERALS 10, 20 eNB
11 DL signal transmitting unit
12 UL signal receiving unit
13 RRC processing unit
14 UE context management unit
15 authenticating unit
16 NW communication unit
30 MME
31 eNB communication unit
32 SGW communication unit
33 communication control unit
40 S-GW
41 eNB communication unit
42 MME communication unit
43 NW communication unit
44 communication control unit
50 UE
51 DL signal receiving unit
52 UL signal transmitting unit
53 RRC processing unit
54 UE context management unit
151 RE module
152 BB processing module
153 device control module
154 USIM slot
251 RE module
252 BB processing module
253 device control module
254 communication IF

The invention claimed is:

1. A terminal in a mobile communication system that supports a function of performing connection establishment reusing context information retained in each of the terminal and a base station, comprising:
 a receiving unit that receives, from the base station, a system information block type 2 (SIB2) including instruction information indicating whether or not the base station supports a function of a Cellular Internet of Things (CIoT) Evolved Packet System (EPS) optimization scheme; and
 a determining unit that determines whether or not the base station has the function on the basis of the instruction information received through the receiving unit;
 wherein, when the CIoT EPS optimization scheme is used in the terminal and upon trigger of a procedure using an initial non-access-stratum (NAS) message, a NAS layer of the terminal requests a lower layer of the terminal to resume a suspended connection, and
 wherein when the suspended connection is resumed, a pending initial NAS message different from a service request message is sent.

2. The terminal as claimed in claim 1,
 wherein the receiving unit receives the instruction information included in broadcast information or a Random Access Response.

3. The terminal as claimed in claim 2, further comprising a transmitting unit,
 wherein the transmitting unit uses a resume ID in a scheme having a connection retention state as a state in which the context information is retained as the context retention information, and transmits a connection resume request message including the resume ID to the base station as the message.

4. The terminal as claimed in claim 1, further comprising a transmitting unit,
 wherein the transmitting unit uses a resume ID in a scheme having a connection retention state as a state in which the context information is retained as the context retention information, and transmits a connection resume request message including the resume ID to the base station as the message.

5. The terminal as claimed in claim 1,
wherein the NAS layer provides to the lower layer a Radio Resource Control (RRC) establishment cause and a call type.

6. A base station in a mobile communication system that supports a function of performing connection establishment reusing context information retained in each of a terminal and the base station, comprising:
a transmitting unit that transmits a system information block type 2 (SIB2) including instruction information, to the terminal, indicating whether or not the base station supports a function of a Cellular Internet of Things (CIoT) Evolved Packet System (EPS) optimization scheme,
wherein the terminal determines whether or not the base station has the function on the basis of the instruction information,
wherein, when the CIoT EPS optimization scheme is used in the terminal and upon trigger of a procedure using an initial non-access-stratum (NAS) message, a NAS layer of the terminal requests a lower layer of the terminal to resume a suspended connection, and
wherein when the suspended connection is resumed, a pending initial NAS message different from a service request message is sent.

7. The base station as claimed in claim 6,
wherein the transmitting unit transmits broadcast information or a Random Access Response including the instruction information to the terminal.

8. The base station as claimed in claim 7, further comprising a receiving unit,
wherein the receiving unit receives a connection resume request message including a resume ID from the terminal as the message.

9. The base station as claimed in claim 6, further comprising a receiving unit,
wherein the receiving unit receives a connection resume request message including a resume ID from the terminal as the message.

10. The base station as claimed in claim 6,
wherein the NAS layer provides to the lower layer a Radio Resource Control (RRC) establishment cause and a call type.

11. A connection establishment method performed by a terminal in a mobile communication system that supports a function of performing connection establishment reusing context information retained in each of the terminal and a base station, the connection establishment method comprising:
a reception step of receiving, from the base station, a system information block type 2 (SIB2) including instruction information indicating whether or not the base station supports a function of a Cellular Internet of Things (CIoT) Evolved Packet System (EPS) optimization scheme; and
a determination step of determining whether or not the base station has the function on the basis of the instruction information received in the reception step;
wherein, when the CIoT EPS optimization scheme is used in the terminal and upon trigger of a procedure using an initial non-access-stratum (NAS) message, a NAS layer of the terminal requests a lower layer of the terminal to resume a suspended connection, and
wherein when the suspended connection is resumed, a pending initial NAS message different from a service request message is sent.

12. The connection establishment method as claimed in claim 11,
wherein the NAS layer provides to the lower layer a Radio Resource Control (RRC) establishment cause and a call type.

13. A connection establishment method performed by a base station in a mobile communication system that supports a function of performing connection establishment reusing context information retained in each of a terminal and the base station, the connection establishment method comprising:
a transmission step of transmitting, to the terminal, a system information block type 2 (SIB2) including instruction information indicating whether or not the base station supports a function of a Cellular Internet of Things (CIoT) Evolved Packet System (EPS) optimization scheme,
wherein the terminal determines whether or not the base station has the function on the basis of the instruction information,
wherein, when the CIoT EPS optimization scheme is used in the terminal and upon trigger of a procedure using an initial non-access-stratum (NAS) message, a NAS layer of the terminal requests a lower layer of the terminal to resume a suspended connection, and
wherein when the suspended connection is resumed, a pending NAS message different from a service request message is sent.

14. The connection establishment method as claimed in claim 13,
wherein the NAS layer provides to the lower layer a Radio Resource Control (RRC) establishment cause and a call type.

* * * * *